United States Patent
Wagh et al.

(10) Patent No.: US 10,422,041 B2
(45) Date of Patent: Sep. 24, 2019

(54) INORGANIC PHOSPHATE CORROSION RESISTANT COATINGS

(71) Applicant: Latitude 18, Inc., Sims, NC (US)

(72) Inventors: Arun S. Wagh, Naperville, IL (US); Vadym Drozd, Miami, FL (US); Sameerkumar Vasantlal Patel, Raleigh, NC (US); Anthony Collins, Sims, NC (US)

(73) Assignee: LATITUDE 18, INC, Sims, NC (US)

( * ) Notice: Subject to any disclaimer, the term of this patent is extended or adjusted under 35 U.S.C. 154(b) by 386 days.

(21) Appl. No.: 15/146,551

(22) Filed: May 4, 2016

(65) Prior Publication Data

US 2016/0319436 A1    Nov. 3, 2016

Related U.S. Application Data

(63) Continuation of application No. 13/493,980, filed on Jun. 11, 2012, now abandoned, which is a continuation-in-part of application No. PCT/US2010/061178, filed on Dec. 18, 2010.

(60) Provisional application No. 61/288,192, filed on Dec. 18, 2009.

(51) Int. Cl.
| | |
|---|---|
| C23C 22/07 | (2006.01) |
| C23C 22/50 | (2006.01) |
| C23C 22/62 | (2006.01) |
| B32B 15/04 | (2006.01) |
| C23C 22/68 | (2006.01) |
| C23C 22/00 | (2006.01) |

(52) U.S. Cl.
CPC .............. C23C 22/62 (2013.01); B32B 15/04 (2013.01); C23C 22/68 (2013.01)

(58) Field of Classification Search
CPC ................................................. C23C 22/07–23
See application file for complete search history.

(56) References Cited

U.S. PATENT DOCUMENTS

| | | | |
|---|---|---|---|
| 2,257,281 | A | 9/1941 | Scholz |
| 2,329,065 | A | 9/1943 | Lum |
| 2,450,952 | A | 10/1948 | Greger |

(Continued)

FOREIGN PATENT DOCUMENTS

| | | |
|---|---|---|
| EP | 256908 A1 | 2/1988 |
| EP | 359002 A1 | 3/1993 |

(Continued)

OTHER PUBLICATIONS

IPO; Office Action for Indian Application No. 5998/DELNP/2012 dated Sep. 15, 2017, 5 pages.

(Continued)

*Primary Examiner* — Lois L Zheng
(74) *Attorney, Agent, or Firm* — Christopher J. Knors; Moore & Van Allen PLLC

(57) ABSTRACT

This disclosure relates to method phosphating an iron surface susceptible to corrosion, the method comprising contacting an iron surface with an aqueous mixture of an acidic phosphate component, a basic component, and at least one silicate; and forming a passivation zone chemically bound to the iron surface of one or more iron ions corresponding to the iron surface, the acidic phosphate component, the basic component, and at least one corrosion inhibitor precursor.

1 Claim, 9 Drawing Sheets

(56) References Cited

U.S. PATENT DOCUMENTS

| | | |
|---|---|---|
| 3,184,320 A | 5/1965 | Michael |
| 3,392,007 A | 7/1968 | Christoffel et al. |
| 3,973,056 A | 8/1976 | Fessler et al. |
| 4,021,528 A | 5/1977 | Schlegel |
| 4,083,933 A | 4/1978 | Schlegel |
| 4,201,592 A | 5/1980 | Doi et al. |
| 4,339,405 A | 7/1982 | Paszner et al. |
| 4,395,456 A | 7/1983 | Jackson et al. |
| 4,478,805 A | 10/1984 | Langer et al. |
| 4,504,555 A | 3/1985 | Prior et al. |
| 4,548,646 A | 10/1985 | Mosser et al. |
| 4,683,151 A | 7/1987 | Hamaguchi et al. |
| 4,721,659 A | 1/1988 | Tieckelmann et al. |
| 4,756,762 A | 7/1988 | Weill et al. |
| 4,799,652 A | 1/1989 | Daussan et al. |
| 4,818,572 A | 4/1989 | Shimamune et al. |
| 4,839,049 A | 6/1989 | Kinney et al. |
| 4,845,136 A | 7/1989 | Saito et al. |
| 5,002,610 A | 3/1991 | Sherif et al. |
| 5,024,825 A | 6/1991 | Buhl et al. |
| 5,039,454 A | 8/1991 | Policastro et al. |
| 5,135,576 A | 8/1992 | Johansen et al. |
| 5,173,960 A | 12/1992 | Dickinson |
| 5,182,049 A | 1/1993 | von Bonin |
| 5,203,915 A | 4/1993 | Alim |
| 5,283,276 A | 2/1994 | Best et al. |
| 5,302,563 A | 4/1994 | Rumpeltin et al. |
| 5,338,356 A | 8/1994 | Hirano et al. |
| 5,401,538 A | 3/1995 | Perito et al. |
| 5,494,708 A | 2/1996 | Chess |
| 5,597,120 A | 1/1997 | Chess |
| 5,624,493 A | 4/1997 | Wagh et al. |
| 5,645,518 A | 7/1997 | Wagh et al. |
| 5,718,757 A | 2/1998 | Guillou et al. |
| 5,830,815 A | 11/1998 | Wagh et al. |
| 5,846,894 A | 12/1998 | Singh et al. |
| 5,911,819 A | 6/1999 | Drs et al. |
| 5,954,867 A | 9/1999 | Chow et al. |
| 5,968,240 A | 10/1999 | Myers et al. |
| 6,103,007 A | 8/2000 | Wu |
| 6,133,498 A | 10/2000 | Singh et al. |
| 6,136,088 A | 10/2000 | Farrington |
| 6,153,809 A | 11/2000 | Singh et al. |
| 6,204,214 B1 | 3/2001 | Singh et al. |
| 6,399,021 B1 | 6/2002 | Heimann et al. |
| 6,458,423 B1 | 10/2002 | Goodson |
| 6,461,415 B1 | 10/2002 | Sambasivan et al. |
| 6,498,119 B2 | 12/2002 | Wagh et al. |
| 6,518,212 B1 | 2/2003 | Wagh et al. |
| 6,561,269 B1 | 5/2003 | Brown et al. |
| 6,569,263 B2 | 5/2003 | Brown et al. |
| 6,723,162 B1 | 4/2004 | Cheyrezy et al. |
| 6,776,837 B2 | 8/2004 | Wagh et al. |
| 6,783,799 B1 | 8/2004 | Goodson |
| 6,790,275 B2 | 9/2004 | Macklin et al. |
| 6,910,537 B2 | 6/2005 | Brown et al. |
| 6,929,865 B2 | 8/2005 | Myrick |
| 7,001,860 B2 | 2/2006 | Wagh et al. |
| 7,083,672 B2 | 8/2006 | Wagh et al. |
| 7,160,383 B2 | 1/2007 | Wagh et al. |
| RE39,804 E | 9/2007 | Wu |
| 7,294,291 B2 | 11/2007 | Wagh et al. |
| 7,312,171 B2 | 12/2007 | Wagh et al. |
| 7,402,542 B2 | 7/2008 | Wagh et al. |
| 7,438,755 B2 | 10/2008 | Wagh et al. |
| 7,699,928 B2 | 4/2010 | Paul, Jr. |
| 2002/0009622 A1 | 1/2002 | Goodson |
| 2002/0123422 A1 | 9/2002 | Wagh et al. |
| 2002/0179190 A1 | 12/2002 | Brown |
| 2003/0092554 A1 | 5/2003 | Wagh et al. |
| 2003/0150614 A1 | 8/2003 | Brown et al. |
| 2004/0206267 A1 | 10/2004 | Sambasivan et al. |
| 2005/0028705 A1 | 2/2005 | Wagh et al. |
| 2005/0160944 A1 | 7/2005 | Wagh et al. |
| 2005/0229809 A1 | 10/2005 | Lally |
| 2005/0241535 A1 | 11/2005 | Bohner |
| 2005/0258405 A1 | 11/2005 | Sayala |
| 2005/0274290 A1 | 12/2005 | Wagh et al. |
| 2005/0288174 A1 | 12/2005 | Wagh et al. |
| 2005/0288175 A1 | 12/2005 | Wagh et al. |
| 2006/0003886 A1 | 1/2006 | Wagh |
| 2006/0048682 A1* | 3/2006 | Wagh ............... C04B 28/34 106/638 |
| 2006/0235258 A1 | 10/2006 | Wagh et al. |
| 2007/0051271 A1 | 3/2007 | Kruse et al. |
| 2007/0051278 A1 | 3/2007 | Wagh et al. |
| 2007/0235702 A1 | 10/2007 | Wagh et al. |
| 2007/0284120 A1 | 12/2007 | Rowen |
| 2008/0020145 A1 | 1/2008 | Pipko et al. |
| 2008/0119682 A1 | 5/2008 | Wagh et al. |
| 2008/0156225 A1 | 7/2008 | Bury |
| 2008/0286609 A1 | 11/2008 | Surace et al. |
| 2009/0020186 A1 | 1/2009 | Pipko et al. |
| 2009/0075051 A1 | 3/2009 | Fyfe |
| 2009/0176110 A1 | 7/2009 | Pabla et al. |
| 2009/0197991 A1 | 8/2009 | Bury et al. |
| 2009/0246389 A1 | 10/2009 | Mosser et al. |
| 2009/0312170 A1 | 12/2009 | Wagh |
| 2010/0083877 A1 | 4/2010 | Selph et al. |
| 2010/0247321 A1 | 9/2010 | Kulkarni et al. |
| 2011/0143910 A1* | 6/2011 | Wagh ............... C01B 25/36 501/134 |

FOREIGN PATENT DOCUMENTS

| | | |
|---|---|---|
| EP | 739953 A2 | 11/2002 |
| EP | 2088225 A1 | 8/2009 |
| GB | 2180231 A | 3/1987 |
| JP | 59131506 A | 7/1984 |
| JP | 62252307 A | 11/1987 |
| JP | 63288904 A | 11/1988 |
| JP | 02180708 A | 7/1990 |
| JP | 04228461 A | 8/1992 |
| JP | 06-122986 A | 6/1994 |
| JP | 06228766 A | 8/1994 |
| JP | 07024815 A | 1/1995 |
| JP | 07-188592 A | 7/1995 |
| JP | H7-188592 A | 7/1995 |
| JP | 08269397 A | 10/1996 |
| JP | 09-142913 A | 3/1997 |
| JP | H9-142913 A | 6/1997 |
| JP | 10-102288 A | 4/1998 |
| JP | 11-209111 A | 3/1999 |
| JP | 2000-169121 A | 6/2000 |
| JP | 2001031408 A | 2/2001 |
| JP | 2003-513820 A | 4/2003 |
| JP | 2004-522688 A | 7/2004 |
| JP | 2004284908 A | 10/2004 |
| NL | 42815 C | 10/1937 |
| WO | 9118072 A1 | 11/1991 |
| WO | 9402428 A1 | 2/1994 |
| WO | 9535266 A1 | 12/1995 |
| WO | 2004015005 A2 | 2/2004 |
| WO | 2006001891 A1 | 1/2006 |
| WO | 2007001344 A2 | 1/2007 |
| WO | 2009100510 A2 | 8/2009 |
| WO | 2009118072 A1 | 10/2009 |
| WO | 2010096827 A1 | 8/2010 |
| WO | 2011075712 A2 | 6/2011 |

OTHER PUBLICATIONS

CIPO; Office Action for Canadian Application No. 2,783,723 dated Nov. 1, 2017, 3 pages.

Bartos, Peter J.M.; "Special Concretes—Workability and Mixing," Proceedings of the International RILEM Workshop organized by RILEM Technical Committee TC 145, 1993, Chapter 9, pp. 66-69.

Gorecki, George, Improved Iron Phosphate Corrosion Resistance by Modification with Metal Ions, Metal Finishing, Mar. 1995, pp. 36-39.

Vippola, et al.; "Aluminum phosphate sealed alumina coating: characterization of microstructure", Materials Science and Engineering, 2002, pp. 1-8, vol. A323.

(56) References Cited

OTHER PUBLICATIONS

Laufenberg, Theodore L., et al.; "Phosphate-Bonded Ceramic-Wood Composites: R&D Project Overview and Invitation to Participate," Proceedings of Ninth International Conference on Inorganic-Bonded Composite Materials, Oct. 2004, pp. 1-12.
Chaplin, Mark; "Guar Gum," London South Park University, Feb. 23, 2004, [Retrieved on Nov. 26, 2013], Retrieved from http://web.archive.org/eb/20040223090608/http://www.lsbu.ac.uldwater/hygua.html.
"7500 Series HVLP Spray Gun," Apollo, 2007, http://www.hvlp.com/product/7500c-series-hvlp-spray-gunt#.
Korean Intellectual Property Office, PCT International Preliminary Report on Patentability and Written Opinion of the International Searching Authority for International Application No. PCT/US2010/046126 dated Jun. 12, 2012, pp. 1-5.
Japanese Patent Office, Japanese Application No. 2012-543319, Office Action dated Jan. 6, 2015, 12 pages.
Japanese Patent Office; Office Action for Japanese Patent Application No. 2012-543319 dated Jan. 22, 2016, 7 pages.
Australian Patent Office; Office Action for Australian Application No. 2010327923 dated Feb. 28, 2014, 11 pages.
Chinese Patent Office; Office Action for Chinese Application No. 201080056375.X dated Oct. 8, 2013, 14 pages.
European Patent Office; Extended European Search Report for European Application No. 10836780.6 dated Jun. 21, 2013, 10 pages.
Korean Intellectual Property Office; PCT International Search Report and Written Opinion for International Application No. PCT/US2010/046126 dated Feb. 28, 2011, 9 pages.
The International Bureau of WIPO; International Preliminary Report on Patentability for International Application No. PCT/US2010/025096 dated Sep. 1, 2011, 15 pages.
Korean Intellectual Property Office; PCT International Search Report and Written Opinion for International Application No. PCT/US2010/059958 dated Aug. 23, 2011, 9 pages.
The International Bureau of WIPO; International Preliminary Report on Patentability for International Application No. PCT/US2010/059958 dated Jun. 21, 2012, 6 pages.
Saudi Patent Office; Office Action for Saudi Arabian Application No. 113340635 dated May 20, 2015, 10 pages.
Latitude 18, Inc., Saudi Arabian Application No. 113340635, Substantial Examination Report, dated Jun. 18, 2015.
Chinese Patent Office, Chinese Patent Application No. 201080056382.X, Office Action dated Jan. 28, 2015, 8 pages.
The International Bureau of WIPO, International Application No. PCT/US2013/045178, International Preliminary Report on Patentability dated Dec. 24, 2014, 7 pages.
Chinese Patent Office, Chinese Application No. 201080056382.X, Office Action dated Sep. 10, 2014, 17 pages.
Korean Intellectual Property Office, PCT International Preliminary Report on Patentability and Written Opinion of the International Searching Authority for International Application No. PCT/US2010/061178 dated Jun. 19, 2012.
Korean Intellectualy Property Office, International Application No. PCT/US2013/045179 International Searc Report and Written Opinion dated Feb. 3, 2014, pp. 1-12.
EPO; Office Action for European Application No. 10836345.8 dated Jan. 3, 2017, 5 pages.
EPO; Office Action for European Application No. 10836780.6 dated Jan. 3, 2017, 7 pages.
CIPO; Office Action for Canadian Application No. 2,783,723 dated Feb. 10, 2017, 7 pages.
JPO; Office Action for Japanese Application No. 2012-543319 dated Sep. 16, 2016, 9 pages.
USPTO; Final Office Action for U.S. Appl. No. 12/711,077, dated Mar. 24, 2015, 10 pages.
USPTO; Final Office Action for U.S. Appl. No. 13/493,980, dated Sep. 3, 2015, 12 pages.
USPTO; Non-Final Office Action for U.S. Appl. No. 14/054,360, dated Nov. 30, 2015, 18 pages.
USPTO; Final Office Action for U.S. Appl. No. 14/512,999, dated Aug. 22, 2016, 22 pages.
USPTO; Non-Final Office Action for U.S. Appl. No. 14/512,999, dated Feb. 23, 2016, 14 pages.
KIPO; Office Action for Korean Patent Application No. 10-2012-7017925, dated Jun. 28, 2016, 8 pages.
IPI; Examination Report for Indian Application No. 5999/DELNP/2012 dated May 24, 2018, 7 pages.

\* cited by examiner

INORGANIC PHOSPHATE CORROSION RESISTANT COATINGS

CROSS-REFERENCE TO RELATED APPLICATIONS

This application is a continuation of U.S. Nonprovisional application Ser. No. 13/493,980, entitled INORGANIC PHOSPHATE CORROSION RESISTANT COATINGS, filed Jun. 11, 2012, which is a continuation in part of PCT/US2010/061178, filed Dec. 18, 2010, which claims priority from U.S. Provisional Application No. 61/288,192, filed Dec. 18, 2009, the entire contents of which is being incorporated by reference herein.

TECHNICAL FIELD

This disclosure relates to passivation layers that inhibit corrosion of metals, and specifically, their manufacture and method of phosphating metallic surfaces prepared from coatings comprising acidic phosphate and alkaline metal oxide/hydroxide components.

BACKGROUND

Corrosion of structural steel and other metals is a serious problem in construction and utility industry. When exposed to humid and saline environments, especially at elevated temperatures, steel deteriorates. To minimize or reduce the extent of this corrosion, alloys of steel, such as galvanized (zinc coated) compositions, or chrome plated compositions are used. While this approach may solve the problem in the short run, the problem persists when the steel is exposed to the above-mentioned environments over long periods of time. This invention discloses uniquely-suited phosphate-based composite coatings that minimize or reduce the corrosion of steel or other metals and make it unnecessary to use alloys of steel such as galvanized (zinc coated) compositions or chrome plated compositions.

Phosphating to passivate a steel surface is generally known in the steel industry. Typically, well polished steel is immersed in phosphate bath of pH between 4-4.5 containing 2-3 g/L phosphoric acid, 2-3 g/L of ammonium or zinc dihydrogen phosphate as buffer, and a small amount (<0.5 g/L) of oxidizer, to produce an iron phosphate passivation layer. In the process, however, hydrogen gas is liberated by the reaction of elemental iron with water in the extremely acidic environment. This produces a very thin passivation layer that is porous and not abrasion resistant, and as a result, an additional coating is required to make the surface of the passivated steel inaccessible to atmospheric oxygen and/or abrasion resistant. This process has, therefore, at least the following disadvantages: (i) an acid immersion bath/tank, which generates sludge as formed by accumulating reaction products—making the bath less effective and creating environmental disposal issues for the sludge and the acidic solution; (ii) oxidizers used in the passivation process produce toxic gases. For example, chlorates produce chlorine, meta nitro benzene sulfonic acid produces nitrous oxide, potassium permanganate presents occupational health risks; (iii) resultant passivation layers are not abrasion resistant, therefore, abrasion resistance must be augmented by additional coating(s).

SUMMARY

In a first embodiment, a method of phosphating at least a portion of an iron surface susceptible to corrosion, providing corrosion protection thereto, is provided. The method comprising contacting an iron surface with an aqueous mixture comprising: an acidic phosphate component; at least one basic component selected from metal oxides or metal hydroxides; and at least one corrosion inhibitor precursor; forming a phosphate-containing passivation layer chemically incorporating the corrosion inhibitor precursor and chemically bound to the metallic surface.

In a first aspect of the first embodiment, the passivation layer is amorphous and/or non-porous.

In a second aspect, alone or in combination with any one of the previous aspects of the first embodiment, the acidic phosphate component is at least one of mono potassium phosphate, mono calcium phosphate, and their hydrates, and the basic component is at least one of magnesium oxide, magnesium hydroxide, calcium oxide, and calcium hydroxide.

In a third aspect, alone or in combination with any one of the previous aspects of the first embodiment, the acidic phosphate component is at least one of alkali metal dihydrogen phosphate $MH_2PO_4$, alkali earth dihydrogen phosphate $M(H_2PO_4)_2$ or its hydrate, and mixtures thereof.

In a fourth aspect, alone or in combination with any one of the previous aspects of the first embodiment, the acidic phosphate component is at least one of mono potassium phosphate, mono calcium phosphate, and their hydrates.

In a fifth aspect, alone or in combination with any one of the previous aspects of the first embodiment, the basic component is at least one of magnesium oxide, barium oxide, zinc oxide, calcium oxide, copper oxide, and hydroxides thereof, or, independently or in combination, magnesium brine containing an effective amount of magnesium hydroxide.

An sixth aspect, alone or in combination with any one of the previous aspects of the first embodiment, the basic component is at least one of magnesium oxide, magnesium hydroxide, calcium oxide, and calcium hydroxide.

In a seventh aspect, alone or in combination with any one of the previous aspects of the first embodiment, the acidic phosphate component is at least one of mono potassium phosphate, mono calcium phosphate, and their hydrates, and the basic component is at least one of magnesium oxide, magnesium hydroxide, calcium oxide, and calcium hydroxide.

In an eighth aspect, alone or in combination with any one of the previous aspects of the first embodiment, the at least one corrosion inhibitor precursor is one or more of a mineral silicate, wollastonite, talc, amorphous magnesium silicate, amorphous calcium silicate, diatomaceous earth, silicon dioxide, and amorphous silicon dioxide.

In a ninth aspect, alone or in combination with any one of the previous aspects of the first embodiment, comprises the reaction of metallic ions corresponding to the metallic surface, the acidic phosphate component, the corrosion inhibitor precursor, and the basic component. The forming step for an iron-containing metallic surface can be carried out at a pH of between about 9 to about 12. The forming step can further comprise the formation of polyphosphates chemically bound to the metallic surface and/or in combination with the corrosion inhibitor precursor.

In a tenth aspect, alone or in combination with any one of the previous aspects of the first embodiment, the step of contacting can comprise, sequentially or concurrently, at least one of painting, brushing, troweling, spraying, and vaporizing one or both of the acidic phosphate component and the basic component.

In a second embodiment, a method of phosphating an iron surface susceptible to corrosion, the method comprising the steps of: (i) mixing an aqueous suspension of at least one basic component from a first fluid state having non-Newtonian fluid behavior to a second fluid state having Newtonian fluid behavior; (ii) combining the basic component with an aqueous suspension of at least one acidic phosphate component so as to form an aqueous mixture; and (iii) contacting an iron surface with the aqueous mixture of step (ii).

In a first aspect of the second embodiment, step (i) is performed at high shear mixing and/or further comprising applying a vacuum at least during the high shear mixing.

In a second aspect, alone or in combination with any one of the previous aspects of the second embodiment, the method further comprising, prior to the combining step, high shear mixing the aqueous suspension of the at least one acidic phosphate component from a first fluid state having non-Newtonian fluid behavior to a second fluid state having Newtonian fluid behavior, optionally applying a vacuum at least during the high shear mixing.

In a third aspect, alone or in combination with any one of the previous aspects of the second embodiment, wherein the at least one basic component is one or more of magnesium oxide, barium oxide, zinc oxide, calcium oxide, copper oxide, and hydroxides thereof, or, independently or in combination, magnesium brine containing an effective amount of magnesium hydroxide.

In a fourth aspect, alone or in combination with any one of the previous aspects of the second embodiment, the at least one acidic phosphate component is at least one of mono potassium phosphate (MKP), mono calcium phosphate, and their hydrates.

In a fourth aspect, alone or in combination with any one of the previous aspects of the second embodiment, wherein the aqueous suspension of the at least one basic component further comprises at least one corrosion inhibitor precursor. The at least one corrosion inhibitor precursor can be at least one of a mineral silicate, wollastonite, talc, amorphous magnesium silicate, amorphous calcium silicate, diatomaceous earth, silicon dioxide, and amorphous silicon dioxide.

In a third embodiment, a coated metal article is provided. The coated metal article comprising a bulk metal substrate; a phosphate ceramic layer, and a passivation layer, the passivation layer positioned between the bulk metal surface and the ceramic layer, the passivation layer comprising at least one iron-magnesium-phosphate moiety and a non-porous, amorphous silicate.

In a fourth embodiment, a formulation comprising: at least one acidic phosphate component; at least one basic component selected from metal oxides or metal hydroxides; and at least one corrosion inhibitor precursor, wherein the at least one corrosion inhibitor precursor is at least one of a mineral silicate, wollastonite, talc, amorphous magnesium silicate, amorphous calcium silicate, diatomaceous earth, silicon dioxide, and amorphous silicon dioxide.

DETAILED DESCRIPTION

Figure 1:
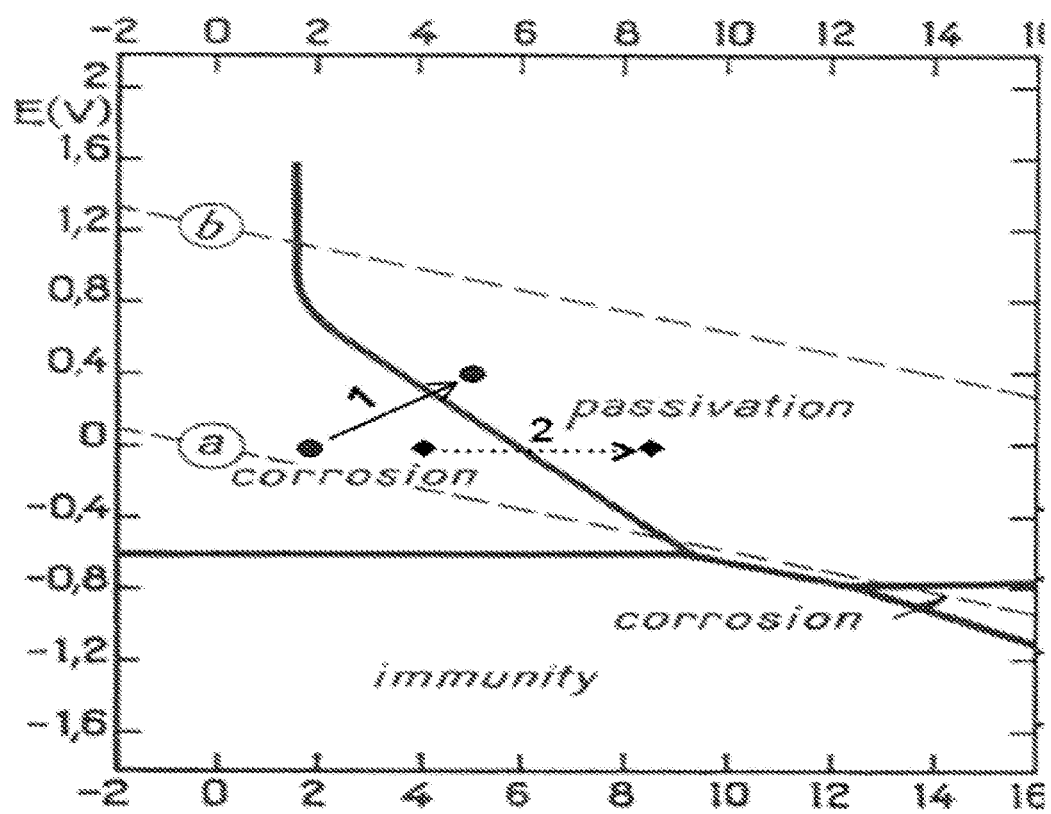
FIG. 1 is a depiction of the redox potential vs. pH diagram for iron showing passivation and corrosion regions and comparing conventional phosphate coating and the methods disclosed and described herein.

It is commonly known that different alloys of steel corrode at very different rates. For example, for a bulk metal such as iron, increasing copper content from 0.01% to 0.05% reduces rate of corrosion by half. Likewise, adding small amounts of nickel and chromium, e.g., in iron, further reduce corrosion rates compared to the non-alloyed metal. However, alloying metal, and in particular iron, is an expensive proposition, and doing so usually changes the properties of the iron, which in turn can effect the utility of the part or apparatus.

Disclosed and described herein is a novel alternative to conventional alloying of metals, wherein the "alloying" is localized to the outer, exposed surfaces and regions just below the outer exposed surface of the bulk metal, yet provides functional attributes similar to bulk alloying processes. The compositions and methods herein, which results in an alloying of the outer, exposed surfaces and regions just below the outer exposed surface of the bulk metal surface, is a cost effective process and doesn't substantially affect other bulk properties of the metal, in contrast to conventional alloying. Moreover, the methods and compositions provide for a chemically bonded, alloyed surface zone that, unlike a polymer coating, provides superior corrosion protection and possibly the added benefit of abrasion resistance to the bulk metal, which are not generally obtainable using polymer coatings. The above methods and compositions provide for an alloyed metallic surface that can be created to impart properties not typically exhibited by the base metal other than corrosion resistance, including abrasion resistance and chemical resistance.

For some metallic surfaces, e.g., iron, the "alloying" can be described generally as phosphating the iron surface with the metallic surface in combination with metals introduced from the acidic phosphate and/or basic component forming a passivation layer chemically associated with the metallic surface. Based on characterization data, the passivation layer is sandwiched between the metallic surface and a phosphate-based ceramic-like coating. It has now been determined that the passivation layer can be chemically and structurally modified to improve its corrosion resistance. In one aspect, silicates are included with the acidic phosphate and basic component. Introduction of an effective amount of silicates provides, in certain aspects, an insoluble passivation layer that is essentially amorphous. In other aspects, introduction of an effective amount of silicates provides, in certain aspects, an insoluble passivation layer that is essentially amorphous and non-porous. The introduction of an effective amount of silicates provides, in certain aspects, a thicker passivation layer that is more stable to corrosive environments and/or capable of electrically isolating the metallic surface.

In addition to the management of the passivation layer chemistry and structure, the present disclosure provides manufacturing methods that optimize the preparation of the acidic phosphate components and the basic components prior to combination so as to manage the chemical reactions and/or pH of the chemical reactions of the metallic surface and the acidic phosphate components and the basic components. The manufacturing methods further improve the incorporation of silicates into the passivation layer, further providing insoluble, amorphous, and/or non-porous passivation layers that eliminating the need for conventional post-treatment of the metallic surface.

As used herein, the phrase "sparingly soluble acidic phosphate component" refers to inorganic phosphates of chemical formula $A^m(H_2PO_4)_m \cdot nH_2O$, where A is metal cation, or mixtures thereof; where m=1-3, and n=0-6. Such inorganic phosphates typically have low solubility constants characteristic of low aqueous solubility. In one aspect, the phrase "sparingly soluble acidic phosphate component" excludes phosphoric acid and ammonium phosphate. Because solubility product constants may be pH dependent, the above phrase includes the addition of small amounts of phosphoric acid to the aqueous mixture of sparingly soluble acidic phosphate component to provide a target solubility product constant relative to that of the basic component.

As used herein, the phrases "acidic phosphate component" and "acidic phosphate precursor" are used interchangeably unless otherwise indicated. Likewise, the phrases "basic component" and "alkaline component" and "alkaline precursor" are used interchangeably unless otherwise indicated. The phrases "basic component" and "alkaline component" and "alkaline precursor" include such materials that are sparingly soluble, e.g., have low solubility product constants in aqueous media, and preferably, lower than that of the corresponding sparingly soluble acidic phosphate component.

As used herein, the phrase "aqueous mixture" refers to a combination of at least a quantity of water and at least one of the sparingly soluble acid phosphate or basic component. For example, the aqueous mixture can contain mostly water and suspended, dispersed, or slurried components, and may also contain non-aqueous components such as alcohols and other solvents. Preferably, water is the major liquid phase. The amount of solids (e.g., the sparingly soluble acid phosphate or basic component and/or other solids) present in the aqueous mixture can be between 1 wt. % to about 95 wt. %, preferably 35-90 wt. %, or 50-80 wt. % solids.

The uniquely-suited formulations and methods disclosed and described herein are based, in one aspect, on acid-base inorganic phosphate compositions. It is believed that similar principles are applicable for other acid/base pair compositions other than inorganic phosphates. Examples of the inorganic phosphate coatings provided herein include a magnesium potassium phosphate coating, and calcium potassium phosphate coating, either of which optionally contains silicates chemically integrated therewith. These compositions are disclosed herein for coatings on steels, aluminum, and other corrodible metals as effective corrosion inhibitors.

It has now been observed that certain corrosion inhibitor precursors, such as, for example, silicates, including $SiO_2$ and especially wollastonite and/or amorphous magnesium silicate, when added to or formed "in-situ" with an acidic phosphate component/basic component composition increase the thickness of the passivation layer and greatly enhance the corrosion resistance of the coating.

Most phosphate coatings serve as a surface preparation for further coating and/or painting, a function it performs effectively with excellent adhesion and electric isolation. Indeed, the conventional phosphating of metal requires subsequent porosity of the phosphate (or metal-phosphate layer) so that additional materials can seep into the phosphate coating and become mechanically interlocked, providing a non-porous top coat. These conventional processes effectively result in corrosion protective agents/layers on top of the passivation layer. In contrast to the conventional methods of passivating/corrosion protecting metal surfaces, the present disclosure provides improving the metal-phosphate passivation layer, reducing its porosity and/or reducing its crystallinity such that the corrosion preventive aspects are chemically associated with the passivation layer.

Thus, while not to be held to any particular theory, it is generally believed, in the example of an iron/steel surface, that an iron phosphate surface is created upon exposing steel to an aqueous suspension of the acidic phosphate in the presence of an aqueous suspension the basic (alkali) component. The aqueous suspension of acidic phosphate comprises one or more sparsely soluble acid phosphate salts with or without phosphoric acid, the mixture having a pH between about 1 and about 6 (preferably being between about 3 to about 5. The aqueous suspension of basic component comprises sparsely soluble alkali minerals, optionally comprising corrosion inhibitor precursors, having a pH between about 8 to about 12, preferably about 9 to about 11. Corrosion inhibitor precursors include, for example, wollastonite, amorphous magnesium silicate, silica, amorphous silicon dioxide, diatomaceous earth, and the like. Because of the difference in solubility, the acidic phosphate component, with a higher solubility than that of the basic component, can enter into solution first or in slight excess, and can react with the metallic surface (e.g., iron/steel) to provide metallic ions (e.g., ferrous ions) at the surface and/or in the aqueous phosphate suspension, which is relatively acidic at the metallic surface. As the basic component goes into solution, it can react with the acidic phosphate component and/or the metallic ions, and chemically combine with the metallic phosphate at the surface and/or in solution. It is generally believed that the suspension can become temporarily alkaline in the local environment of the metallic surface, which may result in more acidic phosphate from the suspension to enter into solution such that the local environment about the metallic surface slurry becomes acidic again. This acid-base equilibrium process can repeat multiple times, with the system ultimately reaching a thermodynamic and/or kinetic equilibrium at the metallic surface that is believed to be in the alkaline range. In this process, it is further believed that the corrosion inhibitor precursors, which are generally alkaline as aqueous suspensions, can be chemically incorporated into the metallic-phosphate and/or chemically bond to the metallic surface. Thus, the present method, in addition to putting additional corrosion inhibitors directly into the conversion coating that chemically interact also creates a more stable and less soluble metallic phosphate. In one aspect, the instant method provides, for a treated iron or steel surface, at least one iron-magnesium-phosphate moiety is believed formed, e.g., hydrated magnesium hydrogen iron phosphate, that is chemically distinct from $FePO_4$ $(2H_2O)$ $Fe_3(PO_4)_2$ $(8H_2O)$, and/or $Fe_5H_2(PO_4)_2$ $(4H_2O)$ provided by conventional iron phosphating processes, the latter being generally crystalline and porous. Additional compositions, including, polyphosphates, and/or amorphous metal-silicates, discussed below, can be present and provide additional and/or synergistic corrosion protection.

In other aspect, the addition of other corrosion inhibitor precursors in combination with the acidic phosphate component and the basic component is provided to improve the corrosion resistance and/or modify the passivation layer. To be clear, such corrosion inhibitor precursors are not simply "fillers." The corrosion inhibitor precursors are added and intended to chemically combine with one or more of the acidic phosphate component, the basic component, the metallic surface, and the metallic phosphate moieties present and/or created at or in the passivation layer. The corrosion inhibitor precursors can be, for example, silicates, such as wollastonite, talc, amorphous magnesium silicate, amorphous calcium silicate, diatomaceous earth, silicon dioxide, and amorphous silicon dioxide. Other silicates can be used. While not limited to any particular theory, the corrosion inhibitor precursors such as silicates and/or alkali/alkali earth metal silicates, can contribute to the amorphous nature of the passivation layer and/or its non-porosity to provide an improved passivation layer. Prior to the instant disclosure, incorporation, e.g., chemically, of silicate materials directly into the passivation layer was not the object of corrosion protection and/or not enabled because of the solubility and/or fluid characteristics of the acidic phosphate/basic metal oxide/hydroxide systems used. In contrast, conventional corrosion inhibitors typically are placed on top of the metal phosphated layer, as it was difficult if not impossible to incorporate them directly into the metal phosphate layer. Conventional corrosion inhibitors can, of course be included in the above formulations or used afterwards (e.g., anti-corrosion polymer coatings).

In one aspect, a coated metal article is provided comprising a bulk metal substrate; a ceramic layer, and a passivation layer, the passivation layer positioned between the bulk metal surface and the ceramic layer, the passivation layer comprising an iron phosphate and a substantially amorphous silicate composition. The passivation layer is essentially non-porous, e.g., to water. The final pH of the coating is provided in the passivation range of steel, e.g., between about pH 9 and about pH 12. In the case of an iron substrate, for example, the composition of the passivation layer, based on characterization data, is believed to comprise Mg, Si, P, S, K, and Ca in a range of about 1% to about 12%, iron about 45-80 weight percent, the remainder being oxygen, hydrogen and trace elements.

Similar conversion coatings can be provided for aluminum or aluminum alloys using the methods and compositions herein disclosed, preferably adjusting the final pH of the passivation process and layer to be between about pH 4 and about pH 8, and optionally, the addition of corrosion inhibitor precursors selected from those which are optimal for aluminum or aluminum alloys. Other corrosion inhibitors, in addition to or independently, can be added to the acidic phosphate component/basic component composition prior to set.

Addition of other corrosion inhibitor precursors in the acidic phosphate/basic component composition can be employed. Additional corrosion inhibitor precursors including things like wollastonite, talc, amorphous magnesium silicate, silicon dioxide, amorphous silicon dioxide, and other silicates.

When applied to a metal surface as a paste, spray or vapor coating, the compositions react depending on their solubility product constants, e.g., where the more soluble component (e.g., preferably the acidic component) reacts with ions associated with the bulk metallic surface substantially or to an extent before the less soluble component (e.g., the basic component). After reactions of the more soluble component with the ions of the bulk metallic surface, the second component reacts providing an alloying surface zone that is chemically bound to the metallic surface and includes the reaction products of the ions associated with the metallic surface (e.g., metal ions), and in combination, the acid/base components, bonding therewith and forming a thin layer/coating to the metallic surface. The bonded layer is hard and inhibits corrosion of the metal surface. A range of phosphate-based formulations may be used to coat and prevent or minimize the corrosion of metallic surfaces. The metallic surface can be pristine, polished, and/or contain pre-existing corrosion. By selecting the acid component and basic component based on their solubility in the media used to apply them to the metallic surface, the aforementioned reaction products form that provide an improved corrosion coating for the bulk metal.

The instant compositions can be configured as atomizible, sprayable inorganic phosphate precursor compositions that can be sprayed at a relatively thin thickness. The compositions can hold high solids contents and yet still hold the solids until setting and thus avoiding the solids migrating or dislodging from the point of application, e.g., down a wall, beam, curved surface, or from a ceiling surface. Such spray coated phosphate ceramic compositions produce high-strength, rapid-setting phosphate ceramic coatings that provide corrosion protection and/or be used as an undercoating in combination with a polymeric coating or paint, such as an acrylic- or urethane-based coating or paint. In one aspect, said phosphate spray coating compositions are suitable for spray coating on metal surfaces, for example, structural elements and chassis of transportation vehicles such as automobiles, trains, cycles, aerospace vehicles, trucks, and buses.

In one aspect, the atomizable phosphate ceramic composition can comprise an acidic phosphate component comprising an aqueous solution, suspension, or slurry of an acid-phosphate, for example, of chemical formula $A_m(H_2PO_4)_m \cdot nH_2O$, where A is hydrogen ion, ammonium cation, metal cation, or mixtures thereof; where m=1-3, and n=0-6; the first component solution adjusted to a pH of about 2 to about 5; a basic component, comprising, for example, an aqueous solution, suspension, or slurry of an alkaline oxide or alkaline hydroxide represented by $B_2 mOm$, $B(OH)_2m$, or mixtures thereof, where B is an element of valency 2m (m=1, 1.5, or 2) the second component solution adjusted to a pH of between 9-14; and a rheology modifier/suspending agent in an amount capable of providing shear thinning of either the first component or the second component and further capable of suspending a high solids content of either the first component or the second component for atomization. Optionally, pigments and/or aggregate material can be present in an amount in at least one of the acidic phosphate and the basic component capable of imparting an observable color and/or texture. The above atomizible spray coating can provide a thin, paint-like coating for imparting corrosion resistance to metallic surfaces. The rheology modifier/suspending agent can be at least one of guar gum, diutan gum, welan gum, and xanthan gum. By using a rheology modifier/suspending agent in an amount capable of providing shear thinning of either the acidic component or the basic component and further capable of suspending a high solids content of either the acidic component or the basic component for atomization, excellent paint-like coatings for imparting corrosion resistance to metallic surfaces are obtained.

Processes and articles prepared therefrom disclosed and described herein overcome many if not all of the problems related to conventional passivation processes of iron, steels, aluminum, and other corrodible metals. The instant processes also provide a more economical, environmentally-friendly method of coating steel and other metal surfaces with acid-base inorganic phosphate based coatings that not only passivate the layer but also provide abrasion resistance along with good aesthetics in one step.

Referring now to FIG. 1, which is a representation showing stability regions of various phases of iron as a function of pH and the redox potential Eh. The black bold curves separate immunity, corrosion, and passivation regions for steel, where the lower region represents the immunity region where iron remains in metal form, the left hand side of this region is the corrosion region where iron is dissociated into $Fe^{2+}$(aq) ions, and the right hand side representing the passivation region where iron becomes iron trihydroxide $Fe(OH)_3$.

When phosphating is done according to the conventional processes of dip coating steel components in a bath of phosphoric acid (or an acid phosphate) and an oxidizer, the steel surface moves from very low pH to slightly higher pH and at the same time, due to presence of the oxidizer, it also moves to a higher Eh point (see line 1). In the process, it passes from the region of corrosion to passivation and the surface is converted from a corrosive layer to a passivating layer. This passivation layer is essentially that of iron phosphate ($FePO_4$), magnetite, and iron hydroxide ($Fe(OH)_3$). The surface is generally porous and smooth and therefore needs an additional protective coating to plug in the porosity in order to protect the passivated surface completely from atmospheric corrosion. This also represents the process in which an oxidant, such as potassium permanganate, is used. Conventional polymeric coatings can be characterized as moving the steel surface from the corrosion region to passivation region by oxidizing the steel surface to $Fe(OH)_3$. However, the passivation layer formed from this conventional process is fairly close to the region of corrosion for steel and thus, explains at least in part, some of the inferior characteristics of this method. Polymer coatings are also easily damaged, and cannot generally be applied over a pre-existing corroded surface, which further reduces their desirability as corrosion protection coatings.

In contrast, in one aspect, the process disclosed and described herein is based on an inorganic phosphate coating produced by acid-base reaction of an acidic phosphate and a metal oxide or metal hydroxide, or oxide mineral, optionally with a silicate. Since the instant process is essentially based on an acid-base reaction, the end reaction product is near neutral, and the pH of coatings prepared therefrom are believed to be between 8 and 9, which is further positioned in the passivation region as shown in FIG. 1. In preferred aspects, there is present a (stoichometric) excess of alkaline precursor distribution in the final coating that has not reacted, which is believed beneficial in raising the pH of the coating beyond 7 to further position the coating in the passivation region as represented in FIG. 1. It is also preferred that the passivation layer of the present disclosure contain amorphous silicate structure. The silicate structure can be an amorphous metal silicate, such as magnesium silicate, calcium silicate. In another aspect, the passivation coating of the present disclosure has a structure that is substantially non-porous, e.g., non-porous to aqueous media.

Due to sufficiently high pH of the instant compositions and formulations, steel surfaces will likely remain in the pH range of passivation region (well above pH=6, for example, about pH 9 to about pH 12). Thus, the instant passivation layers can protect against intrusion of acidic solutions, at least in part, due to the excess $Mg(OH)_2$ present, which can function as a buffer to protect steel from corrosion. The instant passivation layers are superior to current commercial coatings, e.g., those containing zinc hydroxides, with regard to buffering capacity, because zinc hydroxide is not stable below pH of 5. Thus, zinc oxide coatings can place steel substrate in the corrosion region in acidic environments. Moreover, based on lower electrode potential of magnesium ($Eo^{Mg+2}=-2.37V$) verses zinc ($Eo^{Zn+2}=-0.7V$), either in low pH environments or reduction environments, magnesium-based coatings, as disclosed herein, will provide better protection than zinc-based coatings. Protection of steel in the reduction environment using the instant passivation layers is beneficial for applications requiring high temperatures, such as waste to energy incinerators, turbines, in any hydro carbon combustion environment, and in some chemical processes.

The instant passivation layers disclosed herein can comprise, in part, the formation of poly phosphates, and in particular, poly phosphates formed by phosphites at the interfacial regions of the substrate surface in the instant passivation layer. Polyphosphate can provide abrasion resistance and impermeablity to water and humidity, thus improving abrasion resistance as well as improving corrosion resistance to the substrate surface. In one aspect, polyphosphates in combination with metal silicates are present at the metallic surface and/or interfacial regions of the metal substrate as comprising the passivation layer.

In one aspect, an acid-phosphate composition, one acidic with a pH between about 3 to about 4.5, and the other, an alkaline component with a pH between about 10 and about 11. These two components are contacted with the substrate surface, where they combine form a coating. For example, mono potassium phosphate ($KH_2PO_4$) and a magnesium hydroxide ($Mg(OH)_2$, or its brine) composition with or without fillers such as wollastonite ($CaSiO_3$) or fly ash, can be combined and contacted with a corrodible metal surface (e.g., steel). Once the compositions contact the surface, a coating forms that bonds instantly to the substrate. While not wishing to be held to any particular theory, it is believed that the contact by the acidic phosphate and an alkaline oxide or hydroxide, or oxide mineral components provides an initial passivation layer (sub-, primer, or bottom layer) as well as the corrosion protective layer.

Line 2 in FIG. 1 shows at least in part, a typical result of the process disclosed and described herein. In a first step of the instant process, when the mixture of the acid and base is sprayed on the substrate, the acid solution lowers the pH of the substrate. At this point, most if not all of the chemical reactions that occur in the commercial dip coating also occur in the instant process as the first step. However, in the subsequent acid-base reaction, reaction products such as magnetite, or iron hydroxides, react with the phosphate and form iron phosphate. The acid base chemistry of the instant process increases the pH to approximately 8, and in turn, drives the steel substrate pH beyond the corrosion region to the passivation region. In addition, the instant process also produces a phosphate-based abrasion resistant coating, thus resistant to both corrosion and abrasion. Therefore, the instant method eliminates the need for baths of acid solution, sludge to be disposed, the regimental time frame for dipping and drying, and after-coating of the steel.

In certain aspects of the present disclosure, the metallic surface is that of a transition metal or its alloy, for example, iron, chromium, aluminum, copper, etc.

Acidic phosphate component—The acidic phosphate component consists of an acid-phosphate representative of the formula, $A^m(H_2PO_4)_m \cdot nH_2O$, where A is an m-valent element such as sodium (Na, m=1), potassium (K, m=1), magnesium (Mg, m=2), calcium (Ca, m=2), aluminum (Al, m=3) etc. A may also be a reduced oxide phase when higher-valent oxides are used. For example, for iron, which exists in valence state of +2 and +3 (FeO and $Fe_2O_3$ as oxides), A can be the metal of lower oxidation state. It can also be a cation of oxides of four-valent metal oxide such as $ZrO^{2+}$, in which case m=2. $nH_2O$ in the formula above is simply the bound water, where n can be any number, normally ranging from 0 to 25.

It is possible to use hydro phosphates of trivalent metals such as aluminum, iron and manganese represented by the formula $AH_3(PO_4)_2 \cdot nH_2O$, where A is a transition metal that includes aluminum, iron, manganese, yttrium, scandium, and all lanthanides such as lanthanum, cerium, etc.

In case the pH of the acidic precursor is higher than needed for instant reaction, phosphoric acid may be added and the pH may be adjusted to bring down the pH. A preferred pH selected is between 3 and 4, and the most preferred pH is between 3 and 3.5. either elevating the pH of phosphoric acid or that of an acid-phosphate such as magnesium dihydrogen phosphate ($Mg(H_2PO_4)_2$) or aluminum trihydrogen phosphate ($AlH_3(PO_4)_2$) by neutralizing partially using an alkaline oxide, hydroxide, or a mineral, or by acidifying a dihydrogen phosphate such as mono potassium phosphate ($KH_2PO_4$) that has a pH>3.5 by adding a small but appropriate amount of phosphoric acid or a low pH acid phosphate such as $Mg(H_2PO_4)_2$ or aluminum trihydrogen phosphate $AlH_3(PO_4)_2$. Examples described later in this document provide the art of adjusting this pH.

Often the acid-phosphate used in the precursor is only partially soluble. In one aspect, the acid phosphate has a solubility product constant that is greater than the basic component used in forming the acid/base phosphate coating. In one aspect, the precursor is wet-milled so that the average particle size passes through 230 mesh sieve (less than 70 micron).

For oxychloride and oxysulfate compositions, the acidic component consists of magnesium oxychloride, and magnesium oxysulfates appropriately acidified with either hydrochloric acid or sulfuric acid to reduce the pH.

Water may be added to the precursor component to reduce the viscosity thereof, or other types of viscosity reducing agents and/or rheology modifiers may be used. Commercial additives that prevent algae growth may also added to this precursor so that no algae growth occurs during storage of this precursor.

Basic Component include, basic oxides, hydroxides and basic minerals. The basic component generally consists of a sparsely soluble oxide, or preferably a hydroxide with a solubility product constant less than the acid phosphate precursor. In one aspect, a particle size less than 230 micron. The oxide may be represented by the formula $B^{2m}O_m$ or $B(OH)_{2m}$, where B is a 2m-valent metal. All divalent metal oxides (m=1), and some trivalent metal oxides in reduced state fall into this category of small solubility product constant oxides. Examples of divalent oxides are, but not limited to, magnesium oxide, barium oxide, zinc oxide, calcium oxide and copper oxide. Examples of trivalent oxides in reduced state are iron oxide (FeO), and manganese oxide (MnO). In preferred aspects of the instant disclosure, 0 to about 10 molar excess of basic component relative to acidic component is used. For example, about 0-10 molar excess of $Mg(OH)_2$ based on MKP acidic phosphate can be used. In one aspect, the molar ratio of acid:base components can be between about 0.9:1.0 to about 1.0:3.0; preferably about 1.0:2.0; and most preferably, about 1.0:1.8. For example, the composition comprising $Mg(OH)_2$:$KH_2PO_4$=1.8:1.0 provides equal volumes of Parts A and B during spraying. In other aspects, spray coatings of the instant compositions having a molar ratio of about 1:2 or about 1:1.5 (acid:base) with mixing, sprayed well and corrosion protected effectively.

Inorganic Phosphate Coating Compositions

A range of phosphate compositions may be used as the corrosion inhibitor coatings commensurate with the spirit and scope of that disclosed and described herein, the following three exemplary, non-limiting examples are provided:

1. Magnesium potassium phosphate coating formed by the combination and/or reaction of magnesium oxide (MgO) (or a magnesium brine of magnesium hydroxide and magnesium salts in water) and mono potassium phosphate ($KH_2PO_4$), which when combined as suspensions exhibiting Newtonian fluid behavior combine to produce magnesium potassium phosphate ceramic, comprising $MgKPO_4 \cdot 6H_2O$ and a passivation layer comprising metallic phosphates and, when corrosion inhibitor precursors are used, amorphous non-porous silicates. Magnesium potassium phosphate is also referred to hereafter as "MKP". This combination can be combined with silicates, preferably wollastonite and/or amorphous magnesium silicate for improved corrosion resistance for iron, steel, aluminum and aluminum alloy surfaces.

2. Magnesium hydrogen phosphate (newberyite) coating formed by the combination and/or reaction of magnesium oxide (MgO) and phosphoric acid solution ($H_3PO_4$ solution), which when mixed well and allowed to dry, combine to produce a magnesium hydrogen phosphate coating comprising $MgHPO_4 \cdot 3H_2O$.

3. Magnesium hydrogen phosphate (newberyite) coating formed by the combination and/or reaction of magnesium dihydrogen phosphate compositions usually have an aqueous pH between about 2.5 and about 5.0. Magnesium hydrogen phosphate is also referred to hereafter as "MHP". MHP solutions with a pH of about 3 or slightly higher are generally believed more effective in the production of corrosion resistant products and, for at least that reason, tend to be preferred.

For reasons not entirely understood, when the acidic component is phosphoric acid and the basic component is a metal oxide, e.g., iron oxide, in a stoichiometric amount greater than 10% of the acidic phosphate component, corrosion resistance is less than that when using other acidic phosphate/basic components herein disclosed, in particular compared to sparingly soluble acid/base components.

Under ambient conditions, magnesium potassium phosphate compositions, and magnesium hydrogen phosphate compositions exhibit a paste-like consistency. When these compositions are applied to a surface, e.g., steel, as coatings, it is believed that one or more reaction occurs, and/or the one or more reaction occur at different rates, and a thin layer of the above compositions bonds to the metallic surface. The remaining parts of the coatings distal from the metallic surface are loosely bound and can be easily scraped off, but the thin layer coating remains and is very hard, resistant to abrasion, and inhibits corrosion of the surface. Thus, in one aspect, this thin layer acts like a primer, protecting the metallic surface from corrosion. Similar results are observed when these compositions are applied to the surface of other metals besides steel, such as aluminum. It is believed that the same effects would be observed for copper, nickel, tungsten, vanadium and other transition metals prone to oxidation at pH's of between about 2 to about 11, and potentials of about 2 eV to about −2 eV.

Detailed X-ray diffraction studies (see, for example, FIG. 2) of magnesium-containing coatings (e.g., acid phosphate components and/or basic components comprising magnesium) of the instant disclosure appear to comprise a thin layer of magnesium chromate, which is believed formed as a result of the reaction of chromium from the metal surface and magnesium oxide/hydroxide from the instant magnesium-containing coating. The reaction may be represented by

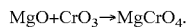
$$MgO+CrO_3 \rightarrow MgCrO_4.$$

Similar results are predicted and/or observed for magnesium/calcium- and calcium-containing coatings (e.g., acid phosphate components and/or basic components comprising magnesium and/or calcium). It is believed that since the excess overlayer of acidic phosphate/alkaline oxide is somewhat deficient in alkaline oxide content, it does not set at this interface and can be easily removed, leaving a thin primer on the surface, which is well bonded.

It is also possible to independently produce this primer by diluting the acidic phosphate/alkaline oxide, material and then applying the diluted coating on the surface. In the case of steel treatment, the thin layer is mostly transparent and it retains the shiny surface and texture of the treated steel.

In another aspect, disclosed and described herein, is a method of contacting a rusted (corroded) surface of steel with a composition comprising an acidic phosphate and alkaline metal oxide/hydroxide, where an excess of the composition and a portion of the rust is rendered readily removable and/or dislodges from the surface, and a thin and hard corrosion protection layer is provided on the steel surface. Thus, the instant passivation layers disclosed and described herein make it is possible to "clean" a surface of rusted steel and apply a corrosion protection layer at the essentially same time.

As discussed above, during the coating of the steel using the instant process, it is believed that a primer is formed by the reaction of chromium from the steel surface and the oxide from the coating. Therefore, in one aspect, an oxide-rich coating, whereby some of the oxide is used in forming a primer and the rest is used in the reaction that forms a acid-base phosphate coating, protective (corrosion/abrasion-resistant) coating, is provided. In one aspect, the compositions disclosed herein can include pigments and/or color aggregates to impart color to the coating. Thus, application of a "primer and paint" can be accomplished in just one step (or one coat), where the primer and/or paint provides corrosion resistance for corrodible surfaces.

In another aspect, the instant corrosion resistant coatings can be formulated to provide aesthetic properties, such as color, proper shine, and texture. This effect may be achieved, for example, by adding pigments, color aggregate, crushed glass, sand, etc, to the instant acidic phosphate/alkaline metal oxide/hydroxide formulations. For example, the resulting coating comprising crushed glass prepared by the processes disclosed herein provides a very dense glassy surface. Additional suitable ceramic pigments may be further added to produce colored paints. Soluble glass in combination with the instant compositions above can also be used in formulations for coating of solid objects, to provide very dense, glassy solid coatings having corrosion resistance.

Experimental Section

The following examples are illustrative of the embodiments presently disclosed, and are not to be interpreted as limiting or restrictive. All numbers expressing quantities of ingredients, reaction conditions, and so forth used herein may be understood as being modified in all instances by the term "about." Accordingly, unless indicated to the contrary, the numerical parameters set forth herein may be approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches. Several experimental examples, listed below, were conducted in order to formulate, coat, and demonstrate the attributes of the instant compositions disclosed herein.

In one aspect, the basic component is prepared as an aqueous suspension. The suspension of basic component is subjected to very high shear mixing for an extended period of time. The fluid properties can be monitored, for example, using a Ford cup or static viscometer. Optionally, vacuum can be applied during the high shear mixing. The suspension of basic component, which initially has non-Newtonian fluid behavior, exhibits Newtonian fluid behavior after sufficient shear thinning, and optional vacuum removal of air, indicating sufficient, if not complete, "wetting" of the basic component in the suspension. Unlike previous process, the basic component is not used or combined with the acidic phosphate component before or while it is shear thinning.

A number of techniques and equipment can be used to impart high shear and/or vacuum to the mixing of the basic component. For example, a dispersion blade in a conventional mixing/spray apparatus can be used with high speed/high shear mixing. Suitable equipment includes, for example a Ross HSM 430SC mixer.

The acidic phosphate component can optionally be subjected to the high shear/vacuum process, where the acidic component exhibits similar behavior as that of the basic component, but to a much lesser degree. It has been observed, however, the high shear/vacuum process can not only provide complete wetting of the acidic phosphate component, but also provide the unexpected benefit of extended shelf life, e.g., in some cases, a useable suspension of the acidic component can be stored for one year or more. In contrast, acidic component that is not treated by the above process will likely not completely wet and as a result, the unwetted material will begin to agglomerate and the suspension will be compromised, resulting in poor pumping, poor shelf life, air bubbles in the resultant coating or product, lower density and/or strength of the phosphate coating. Thus, it can be advantageous to perform the above shear mixing with both components prior to use.

The aforementioned mixing method for the basic component and optionally the acidic phosphate component is further contrasted to that of conventional concretes and cements, such as Portland cement, which can maintain its stability during the wetting process and after mixing. In contrast, individual components of Acid/Base Phosphate cements and ceramics prior to combination are generally known to be unstable during wetting, a characteristic that until now, has limited their use and general acceptance. Conventionally processed phosphate cements and ceramics, for example, Ceramicrete, requires the application/use of the components shortly after they are mixed with water and ultimately and nonetheless results in coatings and products with unreacted components entrapped in the set material.

Thus, the improved wet out and mixing of the acidic phosphate/basic components as presently disclosed provides improved final properties, for example, in composite materials and for imparting corrosion- and/or fire-retardant properties to materials.

Example 1: MHP-Based Corrosion Protection Layer

Figure 2:
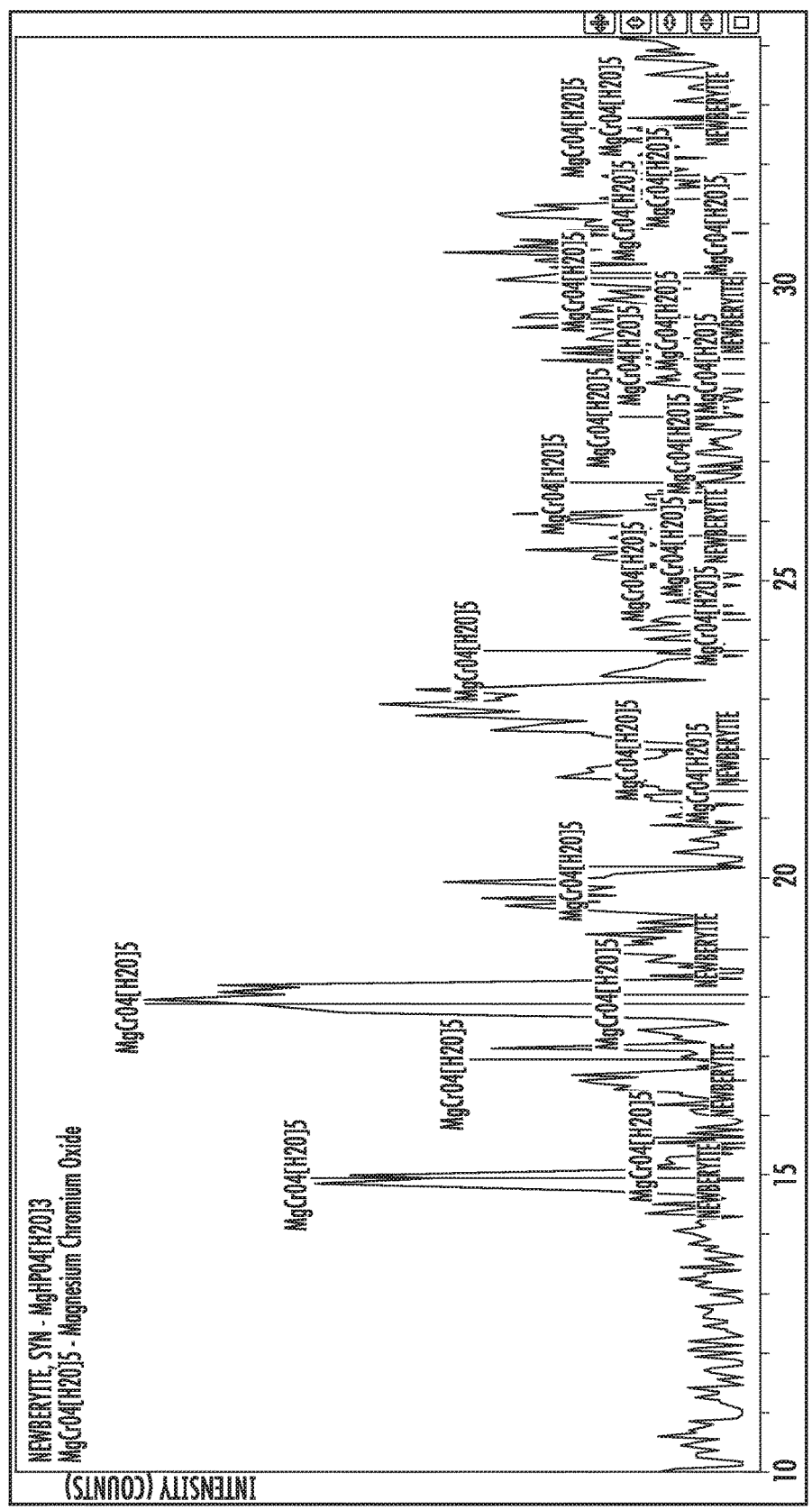
FIG. 2 is an X-ray diffraction pattern diagram illustrating a corrosion protection layer of an exemplary coating composition as disclosed and described herein.

In this Example, MHP ($Mg(H_2PO_4)_2 2H_2O$) was first diluted with water, and calcium silicate and aluminum oxide were added to form a thin paste. The amount of water used in diluting the MHP-based material can vary, depending on the amount of water contained in the material to begin with (most MHP-based materials are difficult to dry when made and, therefore, usually contain some water.) Preferably, dilution water should be added in an amount equivalent to about 20% by weight of MHP. The amounts of calcium silicate and aluminum oxide added to form a thin paste may also vary. In this example, 80 grams of calcium silicate and 60 grams of aluminum oxide were added for each 100 grams of MHP. The calcium silicate and the aluminum oxide were mixed for 10 minutes each. To this mixture, 96 grams of MgO were added for each 100 grams of MHP. When the MgO was added the temperature of the paste was monitored, and mixed until it reached a temperature of about 85° F. The paste was then applied to a well polished steel plate surface and the plate was cured for several days at ambient. After one week, the top (excess) dried layer of the coat could be easily removed, but a thin layer coating was present on the steel surface, which adhered to the surface extremely well. Some of the paste had run down to the other side of the plate and had bonded to the edges of the plate. It was observed that the uncoated side of the plate had corroded in the center, away from the bonded part along the edges, but a contour of non-corroded region remained between the bonded part and the center. It was surmised that the paste segregated on the other side and a thin paste seeped beyond the visible part of the coat on the other side. FIG. 2 shows the X-ray diffraction pattern of this layer on steel, where distinct peaks of magnesium chromate are observed. As discussed above, it is believed that chromium from the steel reacts with magnesium oxide in the acid environment, providing a chemically very stable magnesium chromate product, which may contribute in part to the corrosion protection afforded by the coating.

Example 2: Corrosion Protection Layer on Rusted Steel Surface

Figure 3:
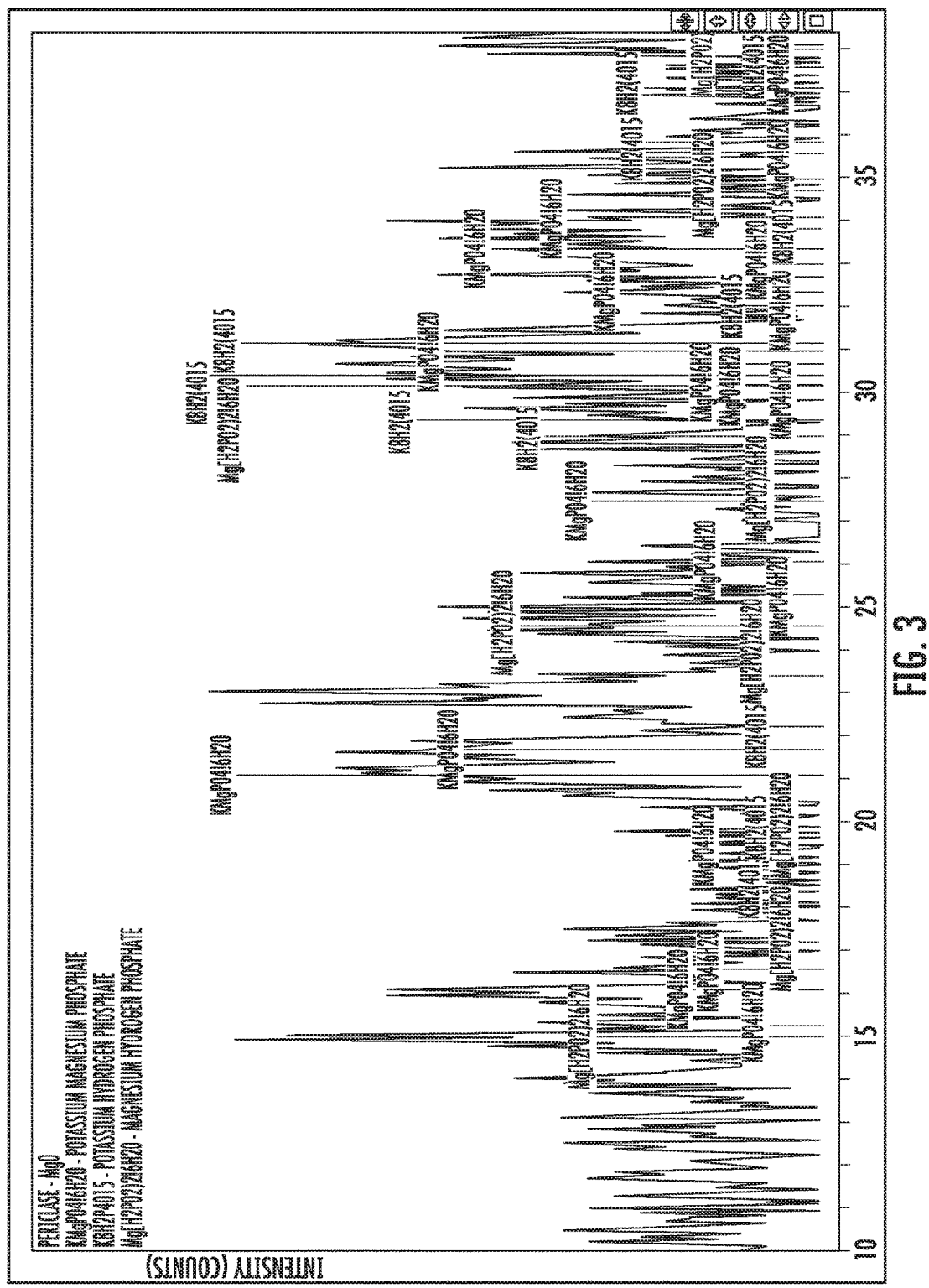
FIG. 3 is an X-ray diffraction pattern diagram illustrating an exemplary coating composition as disclosed and described herein.

In this Example, an MKP-based formulation prepared as a paste comprising calcium silicate was applied on a rusted surface of steel. The MKP paste was formed by mixing one part of dead-burnt magnesium oxide (calcined at temperatures higher than about 1,300° C.), three parts of mono potassium phosphate and six parts of calcium silicate. To this powder mixture was added two parts of water to provide a paste. As mixing was continued, the paste cooled by a couple of degrees initially, indicating dissolution of mono potassium phosphate; but, as magnesium oxide began to react, the temperature began to rise. Mixing was continued until the temperature of the paste rose to about 85° F. and, at this point, the paste was applied to the rusted surface of the steel. When cured, the top (excess) part of the coat could be removed easily. This hardened layer, however, also removed the corrosion (rust) layer from the plate. Surprisingly, a part of the paste had seeped through the rust and had bonded to the underlying steel surface. FIG. 3 shows various phosphate phases contained in this corrosion preventing layer. Noteworthy is that the steel surface did not corrode when kept in humid and hot atmosphere, indicating the acid-base phosphate formation provided a corrosion protection layer.

Example 2A: Corrosion Protection Layer Via High Shear Process

In this Example, three parts of MKP-based formulation prepared as an aqueous suspension and subjected to shearing under vacuum until the fluid presented a Newtonian behavior as determined by static viscometer measurements. One part of $Mg(OH)_2$ brine (61 wt. % magnesium hydroxide and 39 wt. % water), and one part of calcium silicate where suspended in water and subjected to shearing under vacuum until the fluid presented a Newtonian behavior as determined by static viscometer measurements. Optionally, the acidic phosphate and/or the basic component can be wet milled to a reduced average particle size to less than 100 micrometer prior to suspending. The MKP and oxide/silicate were combined and mixed while one or both exhibited Newtonian fluid behavior and applied to an iron surface. When cured, the coating provided a corrosion protection layer superior to that of a similar composition that had not been subjected to shear mixing nor exhibited Newtonian fluid behavior. Substitution of the calcium silicate by amorphous magnesium silicate and/or wollastonite provided improved corrosion prevention compared to formulations without the silicate additive demonstrating that the silicate functions as a corrosion inhibitor precursor. Other silicates can be substituted for or combined, for example, talc, amorphous magnesium silicate, diatomaceous earth, silica, and amorphous silicon dioxide.

Example 3: Iron Oxide Based Corrosion Protection Paint

In this example, 165 grams of MHP material were dissolved in 168 grams of water by mixing and stirring for about one hour. To the resulting solution was added 16.5 grams of wollastonite ($CaSiO_3$) passing 200 mesh. The resulting paste was stirred and mixed for about 35 minutes, after which 200 grams of hematite ($Fe_2O_3$) was added and the paste further stirred and mixed for about 15 minutes. 5 grams of magnetite ($Fe_3O_4$) was then added and the paste further stirred and mixed for about 10 minutes. The resulting paste was then painted onto the surface of a polished mild steel plate. Setting was very slow. There was no detectable heating during curing, however, once set, the coating adhered to the steel surface and could not be removed easily. The coating provided excellent corrosion resistance to the steel. On this surface a second layer of phosphate ceramic, as described in Example 4 below, can optionally be added.

Figure 4:
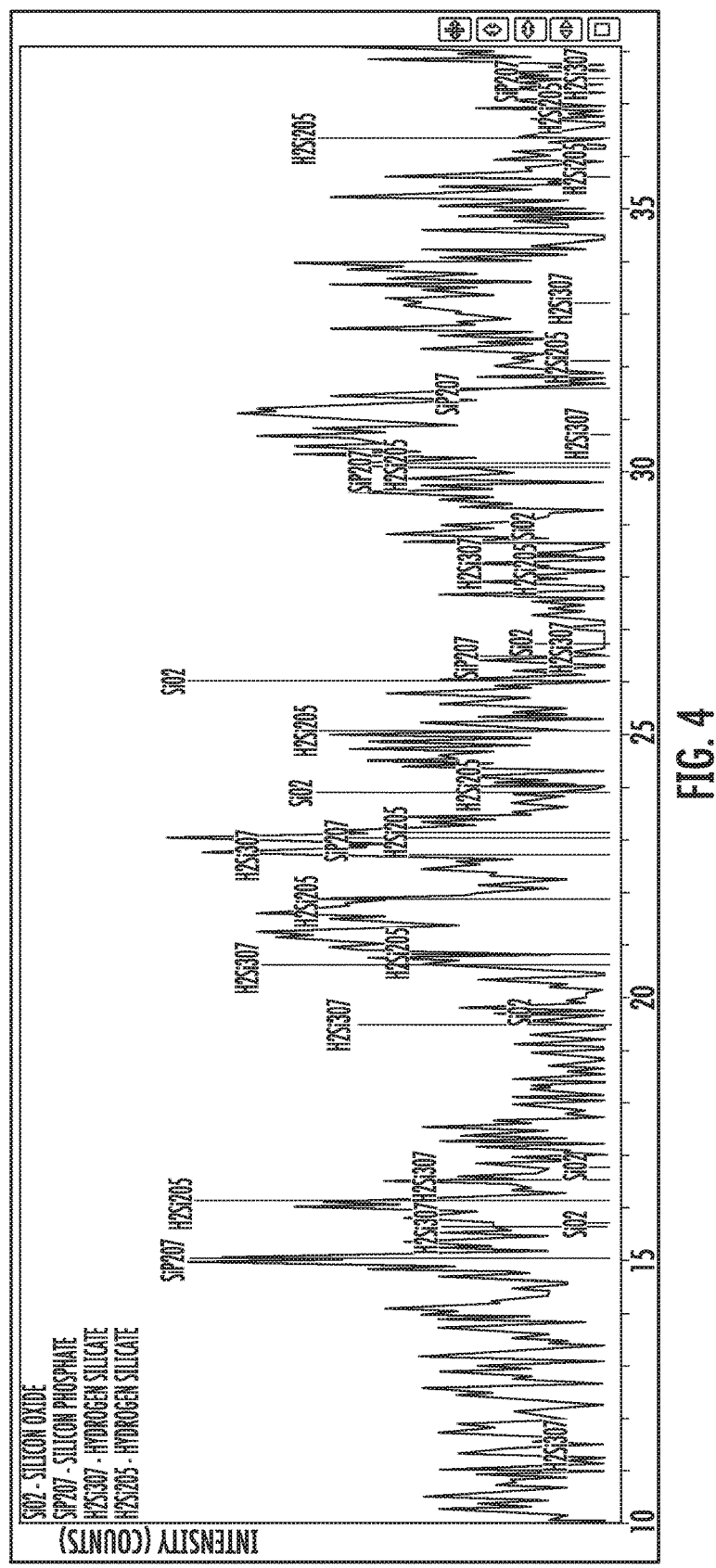
FIG. 4 is an X-ray diffraction pattern diagram illustrating an exemplary coating composition as disclosed and described herein.

Example 4: Magnesium-Glass Phosphate Composite Formulation 300 grams of mono potassium phosphate, 100 grams of crushed (or wet milled) window glass of sand-like consistency (average particle size of 70 micrometer) and 200 grams of water were mixed for about 90 minutes. To this mixture, 100 grams of dead-burnt magnesium oxide were added. The paste was mixed for about 20 minutes, which thickened. The thickened paste was then brushed on the coating described in Example 3, and the remaining paste was poured in a plastic tray. Both samples had hardened by the next day. The coating was well bonded to the primer of the Example 3 and formed an attractive, aesthetically pleasing, shiny (or glossy) coating. The paste poured in the tray was also a very hard ceramic-like material. This ceramic sample was cured for an additional one week and X-ray diffraction studies were performed. FIG. 4 shows a section of the X-ray diffraction pattern clearly indicating that $MgKPO_4.6H_2O$ was formed, as well as several phases of hydrated silico-phosphate minerals. These include, $H_2Si_2O_5$, $H_2SiO_3O_7$, and unhydrated phases $SiP_2O_7$ and $SiO_2$. This composition is unique and can be used in one or more applications, for example, as an electrical insulator, a glossy paint, and/or a corrosion resistant paint.

Example 5: Magnesium-Glass Phosphate Composite Formulation 300 grams of mono potassium phosphate, 100 grams of crushed window glass of sand consistency (average particle size of 70 micrometer) and 200 grams of water were mixed by shearing under vacuum until the fluid presented a Newtonian behavior as determined by static viscometer measurements. To this mixture, 100 grams of an aqueous suspension of $Mg(OH)_2$ having been subjected to shearing under vacuum until the fluid presented a Newtonian behavior as determined by static viscometer measurements was added. The suspensions were loaded in two cartridges of a plural spray gun and the mixed stream was sprayed on sandblasted standard steel panels and provided an excellent corrosion resistant paint.

Example 6: Use of MHP as Corrosion Protective Layer

In this example, a solution of magnesium dihydrogen phosphate material (MHP) was used. MgO was added slowly to water with continuous mixing. About 20% of the stoichiometric amount of MgO was withheld from the formulation and the composition was prepared as a thin paste. This paste was dried at 50° C. and then heated. The result was a set MHP material ($Mg(H_2PO_4)_2 2H_2O$ "s-MHP") manufactured with a sub-stoichiometric amount of MgO and some heat treatment. The s-MHP material was applied over well polished mild steel and the coated steel plate was placed in sunlight in humid conditions. The surface of the steel contacted with the s-MHP material layer remained uncorroded, while surfaces not covered corroded heavily. The s-MHP material had well set on the surface and could not be dislodged easily.

In another test, steel plates were coated with the paste formed as above but with additional MgO (stoichiometric excess). The coating was hard and dense. X-ray diffraction studies on solid samples made by this composition showed that the coating contained newberyite ($MgHPO_4.3H_2O$) and some unreacted magnesium oxide. Some of the paste seeped to the bottom of the plate along the edges. The plate was put in sunlight in a humid environment. The bottom side of the plate corroded at the center, but there was a contour gap between the central corroded part and seeped layer as if the corroded part retreated from the applied region. It is perhaps likely that wet material seeped beyond the set layer and that protected the contoured part from corrosion. Thus, the s-MHP material with added MgO provided a hard, abrasion resistant and corrosion resistant coating to the steel.

Example 7

Wollastonite and water were mixed with $Mg(OH)_2$, with a small amount of $K_3PO_4$ to stabilize the wollastonite, trace surfactant, and xanthan gum as a rheology modifier were mixed at high shear (optionally with applied vacuum) until the mixture exhibited Newtonian fluid behavior as determined by static viscometer to form one stream of a plural spray apparatus. Mono potassium phosphate with a trace of phosphoric acid as an algaecide was mixed with water trace surfactant, and xanthan gum as a rheology modifier at high shear (optionally with applied vacuum) until the mixture exhibited Newtonian fluid behavior as determined by static viscometer to form the second stream. Both were loaded in two cartridges of a plural spray gun and the mixed stream was sprayed on sandblasted standard steel panels. The coating and resultant passivation layer provided excellent corrosion resistance.

Example 8

To prove the concept of the material sustaining very high temperature, calcined magnesium oxide and mono potassium phosphate were mixed as powders in equimolar ratio and were then mixed in water. The resulting paste set into hard ceramic. It was then heated to 3000 F for three hours. It shrunk 10 vol. %, but was a dense and hard ceramic. The measured density of this sample was 2.1 g/cm$^3$.

Energy Dispersive X-Ray Analysis of Coating—

Figure 5:
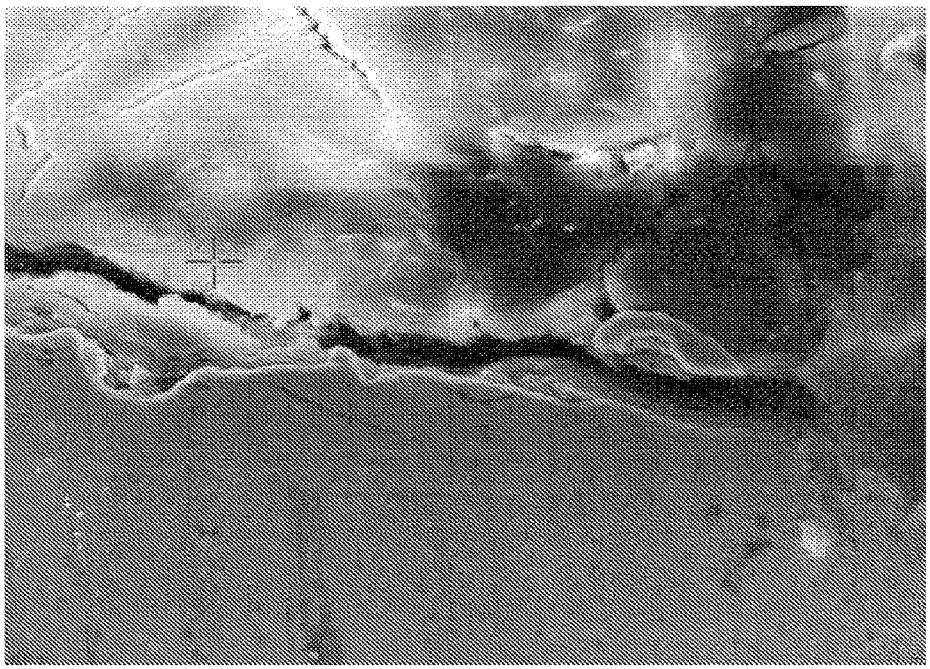
FIG. 5 is SEM image illustrating an exemplary coating composition as disclosed and described herein.
Figure 6:
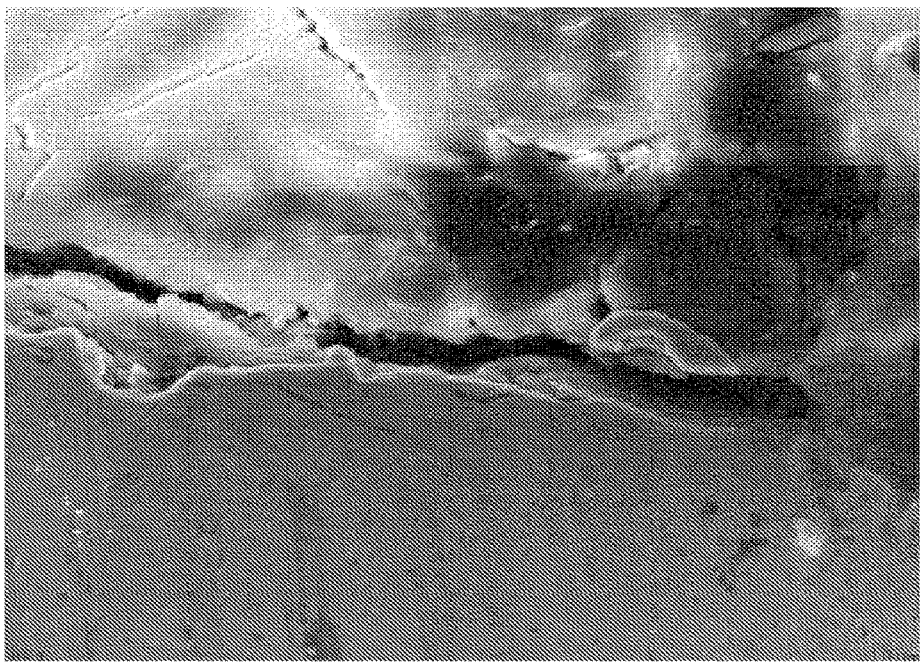
FIG. 6 is SEM image illustrating an exemplary coating composition as disclosed and described herein.

In this test, a mixture of mono potassium phosphate and water (in the ratio 2:1 by weight) in one part of a plural spray gun, and magnesia brine with 61 wt. % magnesium hydroxide and 39 wt. % water and wollastonite in the second part of the gun was sprayed on sandblasted steel panels as one stream. The paste formed by the mixture of the two components set as a coating on the steel surface. The plate was cut vertically to expose the cross section of the coating. Photographs in FIGS. 5 and 6 show the layers far from the substrate and near the substrate respectively. In these photographs, the crosses indicate the points of analyses. Tables 1 and 2 summarizes the analysis of FIGS. 5 and 6 respectively, of positions remote and near from the coating-surface interface, respectively, e.g., elements detected, the wt % and atom % of the coating. The composition of this coating immediate to the substrate is observed to be richer in iron indicating it is a compound of iron and phosphorous. Potassium and calcium contents are observed to be lower in this layer, and magnesium and silicon layers are higher, which indicates the presence of magnesium silicate

TABLE 1

Corresponding to FIG. 5.

| Element | Wt % | At % |
|---|---|---|
| O | 33.72 | 50.28 |
| Mg | 14.72 | 14.45 |
| Si | 04.78 | 04.06 |
| P | 19.13 | 14.73 |
| K | 19.47 | 11.88 |

TABLE 1-continued

Corresponding to FIG. 5.

| Element | Wt % | At % |
|---------|------|------|
| Ca | 06.59 | 03.92 |
| Fe | 01.58 | 00.67 |

TABLE 2

Corresponding to FIG. 6.

| Element | Wt % | At % |
|---------|------|------|
| O | 40.83 | 55.71 |
| Mg | 23.54 | 21.13 |
| Si | 21.90 | 17.02 |
| P | 01.26 | 00.89 |
| K | 02.02 | 01.13 |
| Ca | 00.23 | 00.12 |
| Fe | 10.23 | 04.00 |

Figure 7:
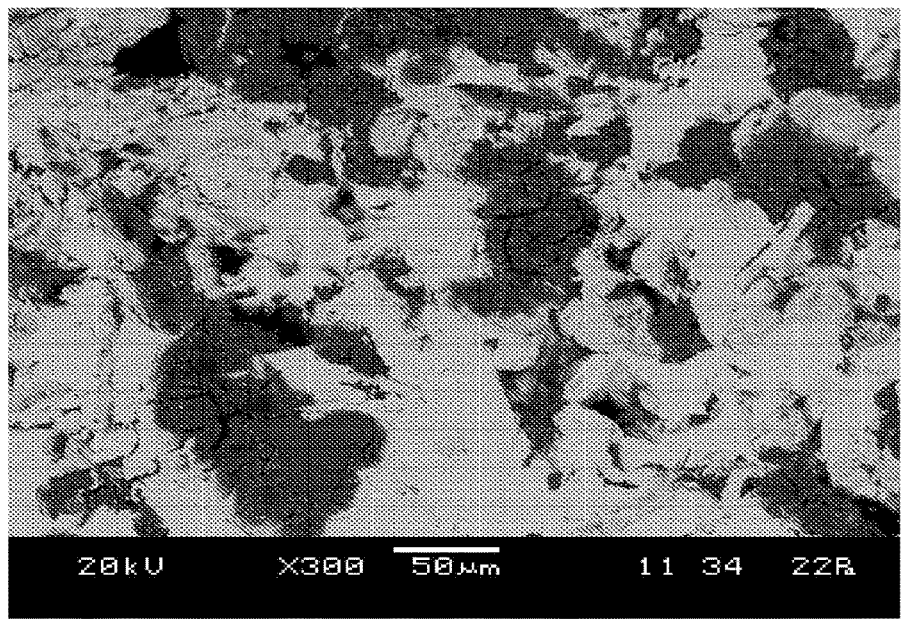
FIG. 7 is SEM image illustrating an exemplary coating composition as disclosed and described herein.
Figure 8:
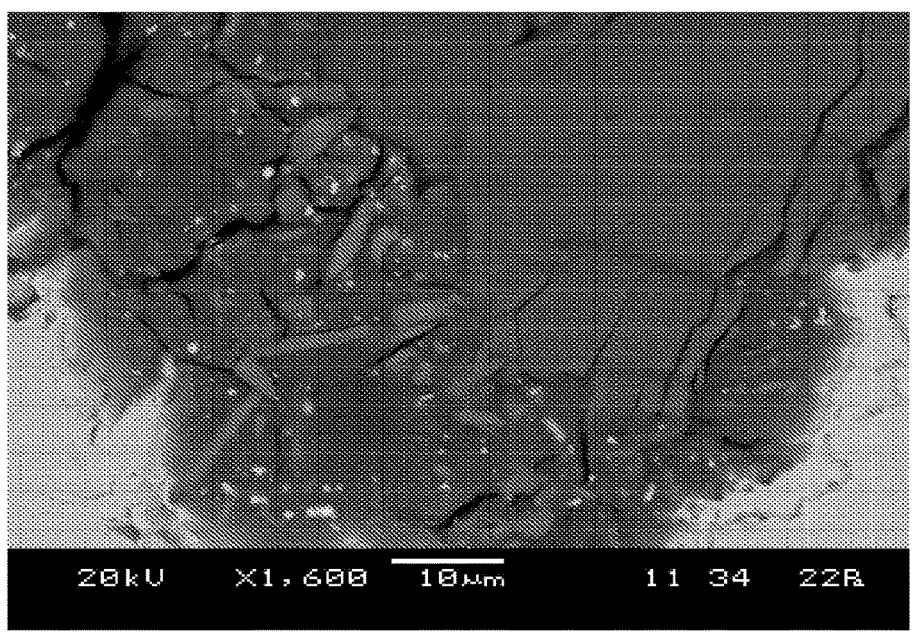
FIG. 8 is SEM image illustrating an exemplary coating composition as disclosed and described herein.

Referring to FIGS. 7 and 8, and Table 3, SEM/EDX data of the same coated sample as above was tilted and polished to expose different thicknesses of the coating and the steel at the other end. The images show the coating is comprised of many layers underneath a surface layer. Analysis of the top layer is given in the last column of Table 3 for comparison. Near equal molar content of Mg, K, and P in the top layer indicates that the top layer comprises mainly $MgKPO_4.6H_2O$. However, distribution of Mg and K are not the same at different depths. Higher amount of Mg in these layers indicates existence of $Mg(OH)_2$. Similarly, content of Ca, and Si also vary indicating non uniform distribution of $CaSiO_3$. Rodlike structures in the right hand side micrographs show existence of wollastonite. Wet milling alone or in combination with the shear mixing of the components and/or the wollastonite discussed above can greatly improve the distribution of the components in the layer, as well as the morphology (amorphousness and/or porosity) of the passivation layer.

TABLE 3

Corresponding to FIGs. 7 & 8.

| Element | Surface layer | | | | | | | | Average | Top layer |
|---------|------|------|------|------|------|------|------|------|---------|-----------|
| O | 52.39 | 51.15 | 57.1 | 46.22 | 46.4 | 47.91 | 47.48 | 52.87 | 50.19 | 55.16 |
| Mg | 17.07 | 16.56 | 21.98 | 30.38 | 27.79 | 29.12 | 14.75 | 30.56 | 23.53 | 14.96 |
| Si | 2.09 | 2.15 | 0.88 | 14.7 | 14.14 | 14.29 | 11.4 | 1.32 | 7.62 | 0.61 |
| P | 12.19 | 12.16 | 9.2 | 0.55 | 2.22 | 0.58 | 7.94 | 5.09 | 6.24 | 15.55 |
| K | 8.7 | 7.92 | 4.58 | 0.34 | 1.08 | 0.7 | 4.84 | 3.43 | 3.95 | 12.67 |
| Ca | 1.1 | 1.59 | 0.6 | 0.16 | 0.23 | 0.32 | 6.25 | 0.61 | 1.36 | 0.53 |
| Fe | 6.47 | 8.47 | 5.65 | 7.64 | 8.15 | 7.08 | 7.34 | 6.12 | 7.12 | 0.53 |

Vapor Deposition of Corrosion Resistant Coatings—

One or both of the acid phosphate or basic components can be vapor deposited, for example from an aqueous solution. This vapor deposition method can provide passivation layers at nano- or micrometer thicknesses. Thus, each component (before or after the shear mixing, preferably after shear mixing and optional vacuum pull) is heated separately to produce vapors. These vapors are then funneled into a common tube, so that the vapors of each component are mixed and then are deposited on the substrate (which can optionally be heated).

Advantage of vapor deposition methods are, a) ability to prepare thin passivating layers, b) minimum use of material, c) uniformity of coats, d) assembly line coating, e) automation of the process.

Self Regenerating Coating Process—

Figure 9:
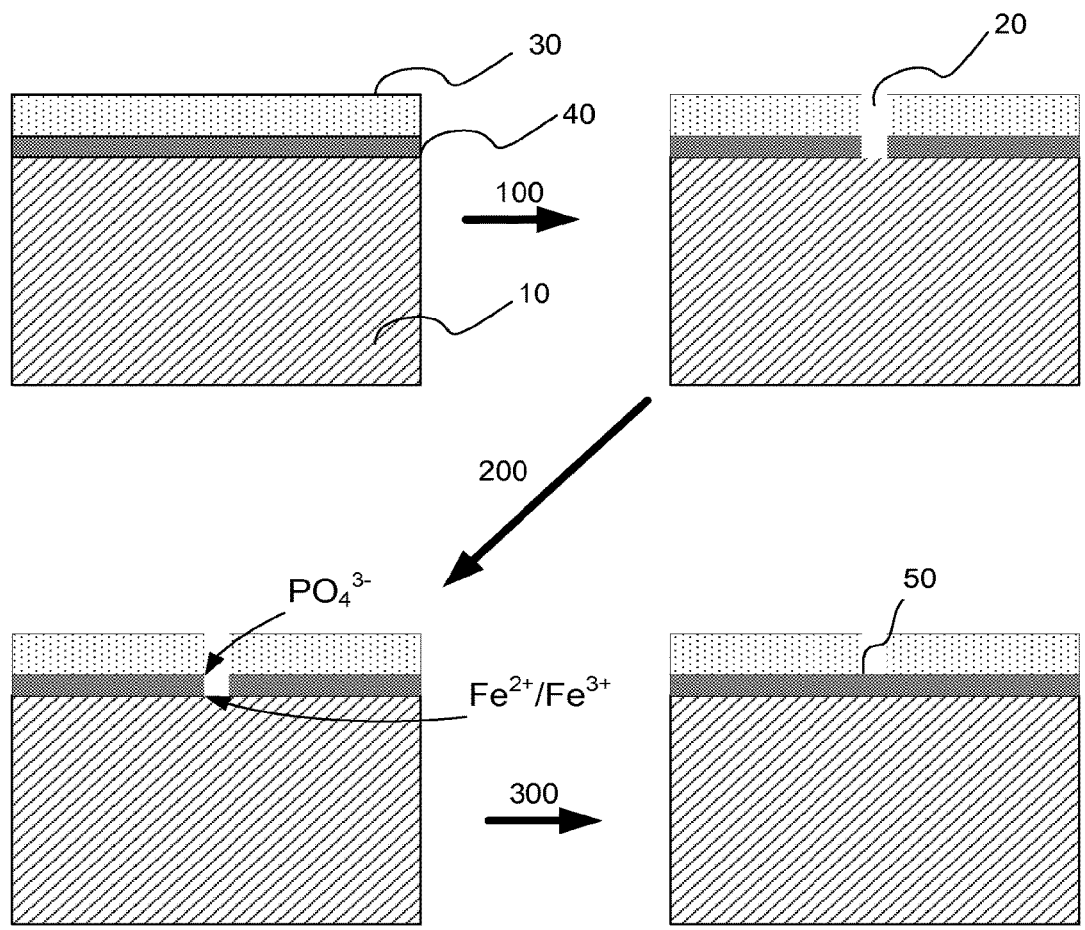
FIG. 9 is diagram illustrating a self-regenerating coating as disclosed and described herein.

Referring to FIG. 9, a schematic of self-regeneration of the corrosion inhibiting layer is shown on a surface (10) of iron. With higher solubility of phosphate ions from $MgKPO_4.6H_2O$ compared to that from iron phosphate, any defects (20) developed in the iron phosphate primer coating (40) (as indicated by step 100) can be healed by tocoat (30) of $MgKPO_4.6H_2O$ as phosphate ions and iron migrate to the defect (as indicated by step 200) and reform (50) the iron phosphate primer coating (40) (as indicated by step 300). Thus, this $MgKPO_4.6H_2O$ top coat essentially heals defects in the thin prime coat on the substrate after a predetermined time.

Raman Spectra of Coatings—

Figure 10:
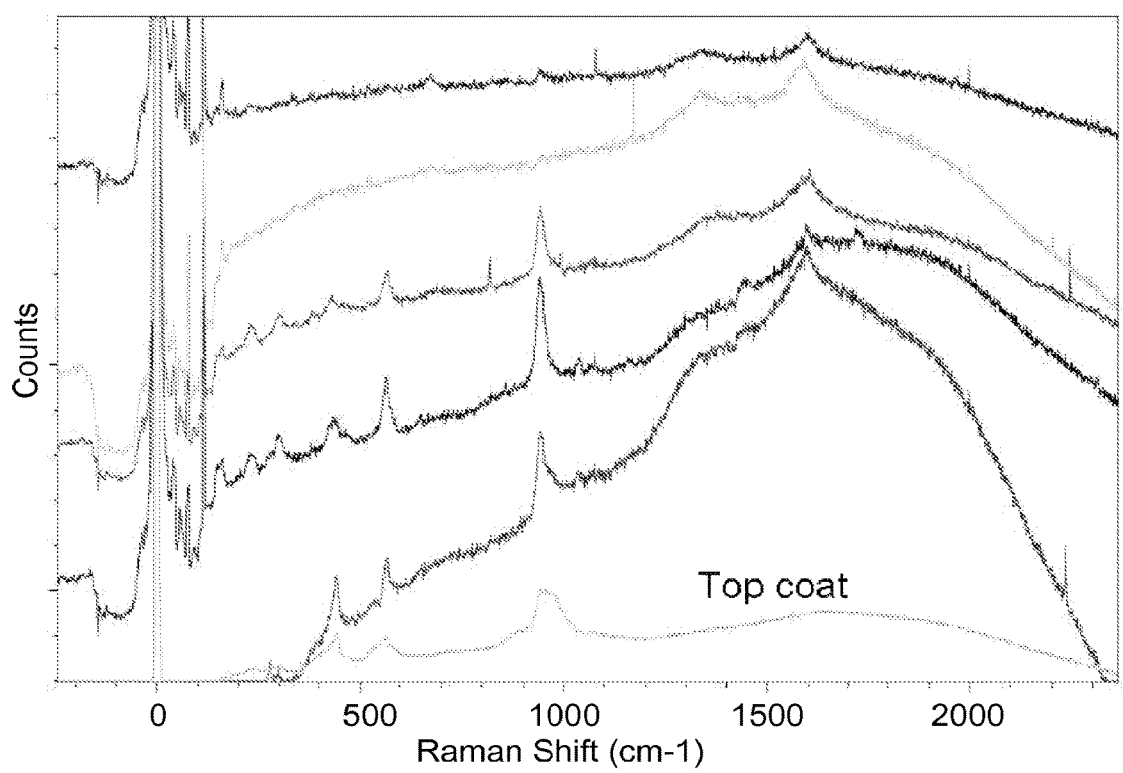
FIG. 10 is a Raman spectrograph of an exemplary coating as disclosed and described herein.

Referring to FIG. 10, All spectra shown are of coatings next to the substrate except the lowest one, which is on a top coat. The peak near 1000 cm-1 represents $MgKPO_4.6H_2O$. The peaks at 1618 cm-1 are identified as polyphosphates formed by Fe—P=O linkages. These polyphosphates may be chemical bonded between the actual coating and the metallic surface.

SEM of Non-Porous Passivation Layer—

Figure 11:
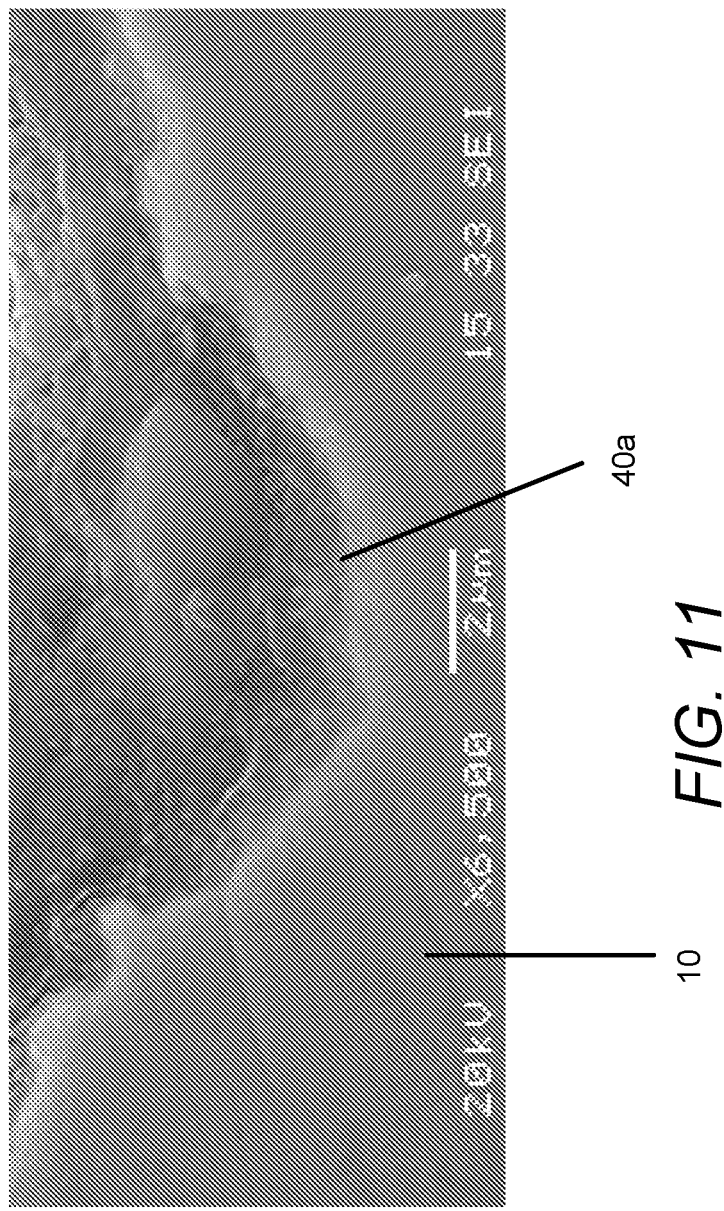
FIG. 11 is an SEM of an exemplary passivation layer provided by the embodiments disclosed and described herein.

A coated steel sample using the formulation of Example 7 was analyzed by Scanning Electron Microscopy (SEM). As seen the SEM image of FIG. 11, the present method provided at least one iron-magnesium-phosphate moiety e.g., hydrated magnesium hydrogen iron phosphate (40a) on iron surface (10), that is chemically distinct from $FePO_4$ $(2H_2O)$ $Fe_3(PO_4)_2$ $(8H_2O)$, and/or $Fe_5H_2(PO_4)_2$ $(4H_2O)$ provided by conventional iron phosphating processes, the latter being generally crystalline and porous. It is generally believed that the presence of an alkali, and particularly a sparsely soluble alkali, and/or the modulation of the pH from acidic to alkaline and back again at the metal surface that provides the non-porous and/or amorphous nature of the passivation. Magnesium oxide and magnesium hydroxide are examples of basic components that can provide this effect on an iron surface, and other metal oxides as well, whereas, it may not be possible in the case of iron oxide to achieve equivalent results.

What is claimed:

1. A method of phosphating at least a portion of an iron surface susceptible to corrosion, providing corrosion protection thereto, the method comprising contacting an iron surface with an aqueous mixture consisting of:
   at least one acidic phosphate component, the acidic phosphate component is at least one of mono potassium phosphate, mono calcium phosphate, and their hydrates;

at least one basic component is at least one of magnesium oxide, magnesium hydroxide, calcium oxide, and calcium hydroxide;

at least one corrosion inhibitor precursor, the at least one corrosion inhibitor precursor is one or more of a mineral silicate, wollastonite, talc, amorphous magnesium silicate, amorphous calcium silicate, diatomaceous earth, silicon dioxide, and amorphous silicon dioxide;

forming an amorphous phosphate-containing passivation layer chemically bound to the iron surface and incorporating the corrosion inhibitor precursor and providing corrosion protection to the contacted iron surface.

* * * * *